United States Patent
Senarath et al.

(10) Patent No.: US 10,862,818 B2
(45) Date of Patent: Dec. 8, 2020

(54) SYSTEMS AND METHODS FOR DISTRIBUTING NETWORK RESOURCES TO NETWORK SERVICE PROVIDERS

(71) Applicants: Nimal Gamini Senarath, Ottawa (CA); Sophie Vrzic, Kanata (CA); Jaya Rao, Ottawa (CA); Hang Zhang, Nepean (CA)

(72) Inventors: Nimal Gamini Senarath, Ottawa (CA); Sophie Vrzic, Kanata (CA); Jaya Rao, Ottawa (CA); Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/259,470

(22) Filed: Sep. 8, 2016

(65) Prior Publication Data
US 2017/0085493 A1 Mar. 23, 2017

Related U.S. Application Data

(60) Provisional application No. 62/222,645, filed on Sep. 23, 2015.

(51) Int. Cl.
*H04L 12/873* (2013.01)
*H04W 72/12* (2009.01)
*H04L 12/911* (2013.01)

(52) U.S. Cl.
CPC ....... *H04L 47/522* (2013.01); *H04W 72/1257* (2013.01); *H04L 47/741* (2013.01); *H04L 47/822* (2013.01)

(58) Field of Classification Search
None
See application file for complete search history.

(56) References Cited

U.S. PATENT DOCUMENTS 5,982,748 A * 11/1999 Yin .................. H04L 47/805
   370/232
6,272,131 B1 * 8/2001 Ofek ............... H04L 12/6418
   370/389

(Continued)

FOREIGN PATENT DOCUMENTS

CA   2874463 C   5/2019
CN   101166181 A   4/2008

(Continued)

OTHER PUBLICATIONS

3GPP TR 22.891 V0.1.0 (Apr. 2015),3rd Generation Partnership Project;Technical Specification Group Services and System Aspects; Feasibility Study on New Services and Markets Technology Enablers; Stage 1(Release 14), total 26 pages.

(Continued)

*Primary Examiner* — Ayaz R Sheikh
*Assistant Examiner* — Tarell A Hampton

(57) ABSTRACT there is provided a method of generating a soft schedule for the transmission of data to a User Equipment. The method includes receiving traffic to be scheduled for transmission and generating a soft schedule for the transmission of the received data in accordance with a resource allocation and the received traffic. The method further includes transmitting the soft schedule to a scheduler in an underlying network slice, for transmission to the UE. There is also provided a scheduler including a processor and machine readable memory storing machine executable instructions which when executed by the processor configures the scheduler perform the above method.

30 Claims, 14 Drawing Sheets

(56) References Cited

U.S. PATENT DOCUMENTS

| | | | |
|---|---|---|---|
| 6,842,783 B1* | 1/2005 | Boivie | H04L 41/0896 370/235 |
| 7,925,756 B1* | 4/2011 | Riddle | H04L 41/0893 709/226 |
| 9,329,937 B1* | 5/2016 | Grant | G06F 11/14 |
| 9,392,471 B1* | 7/2016 | Thomas | H04W 36/0083 |
| 10,039,112 B2 | 7/2018 | Senarath et al. | |
| 10,129,894 B2* | 11/2018 | Farmanbar | H04W 16/10 |
| 2003/0033461 A1* | 2/2003 | Malik | G06F 13/18 710/107 |
| 2003/0103510 A1 | 6/2003 | Svanberg et al. | |
| 2003/0117954 A1 | 6/2003 | De Neve et al. | |
| 2003/0177221 A1 | 9/2003 | Ould-Brahim et al. | |
| 2004/0032847 A1* | 2/2004 | Cain | H04B 7/2643 370/338 |
| 2004/0146036 A1* | 7/2004 | Parantainen | H04W 72/0413 370/341 |
| 2004/0203973 A1* | 10/2004 | Khan | H04L 47/10 455/517 |
| 2006/0085544 A1* | 4/2006 | Chen | G06F 9/505 709/226 |
| 2007/0297367 A1 | 12/2007 | Wang et al. | |
| 2008/0129464 A1* | 6/2008 | Frey | H04L 41/0631 340/146.2 |
| 2008/0130519 A1 | 6/2008 | Bahl et al. | |
| 2009/0191888 A1* | 7/2009 | Abedi | H04W 16/14 455/450 |
| 2010/0046531 A1 | 2/2010 | Louati et al. | |
| 2010/0069081 A1* | 3/2010 | Mitra | H04W 72/042 455/452.2 |
| 2010/0122141 A1* | 5/2010 | Arye | H03M 13/2906 714/752 |
| 2010/0216404 A1 | 8/2010 | Hershey et al. | |
| 2010/0242092 A1 | 9/2010 | Harris et al. | |
| 2011/0125905 A1* | 5/2011 | Baucke | H04M 15/00 709/226 |
| 2011/0246647 A1* | 10/2011 | Marquezan | H04L 43/00 709/224 |
| 2011/0283017 A1 | 11/2011 | Alkhatib et al. | |
| 2012/0051296 A1* | 3/2012 | Kokku | H04W 28/26 370/329 |
| 2012/0120887 A1 | 5/2012 | Deaton et al. | |
| 2012/0233302 A1 | 9/2012 | Kallin et al. | |
| 2013/0007232 A1 | 1/2013 | Wang et al. | |
| 2013/0143574 A1 | 6/2013 | Teyeb et al. | |
| 2013/0182601 A1 | 7/2013 | Bandyopadhyay et al. | |
| 2013/0183991 A1 | 7/2013 | Bosch et al. | |
| 2013/0201847 A1 | 8/2013 | Chincholi et al. | |
| 2013/0212285 A1 | 8/2013 | Hoffmann et al. | |
| 2013/0225123 A1 | 8/2013 | Adjakple et al. | |
| 2013/0295946 A1 | 11/2013 | Panchal et al. | |
| 2013/0303114 A1 | 11/2013 | Ahmad et al. | |
| 2014/0086177 A1 | 3/2014 | Adjakple et al. | |
| 2014/0086194 A1 | 3/2014 | Sugahara | |
| 2014/0115578 A1 | 4/2014 | Cooper et al. | |
| 2014/0119218 A1 | 5/2014 | Hsu | |
| 2014/0200036 A1 | 7/2014 | Egner et al. | |
| 2014/0215466 A1 | 7/2014 | Khasnabish | |
| 2014/0244808 A1 | 8/2014 | Axelrod et al. | |
| 2014/0269295 A1* | 9/2014 | Anumala | H04L 41/08 370/235 |
| 2014/0282769 A1* | 9/2014 | Salem | H04N 21/23406 725/94 |
| 2014/0301192 A1 | 10/2014 | Lee et al. | |
| 2014/0317261 A1 | 10/2014 | Shatzkamer et al. | |
| 2014/0376555 A1 | 12/2014 | Choi et al. | |
| 2015/0011234 A1 | 1/2015 | Wei et al. | |
| 2015/0043382 A1 | 2/2015 | Arora et al. | |
| 2015/0063112 A1* | 3/2015 | Wu | H04L 45/302 370/235 |
| 2015/0100694 A1 | 4/2015 | Sohail | |
| 2015/0104172 A1 | 4/2015 | Wang et al. | |
| 2015/0109995 A1 | 4/2015 | Mathai et al. | |
| 2015/0154258 A1* | 6/2015 | Xiong | G06F 17/30463 707/718 |
| 2015/0173111 A1 | 6/2015 | Agarwal et al. | |
| 2015/0236948 A1 | 8/2015 | Dunbar et al. | |
| 2015/0288541 A1 | 10/2015 | Fargano et al. | |
| 2015/0351118 A1 | 12/2015 | Arnott et al. | |
| 2016/0044702 A1* | 2/2016 | Centonza | H04W 24/08 370/328 |
| 2016/0328259 A1 | 11/2016 | Xia et al. | |
| 2016/0337442 A1* | 11/2016 | Idicula | G06F 17/30584 |
| 2016/0352528 A1* | 12/2016 | Law | H04L 12/6418 |
| 2016/0353422 A1* | 12/2016 | Vrzic | H04W 16/02 |
| 2017/0064031 A1* | 3/2017 | Sunay | H04W 72/082 |
| 2017/0079059 A1* | 3/2017 | Li | H04W 16/02 |
| 2017/0104609 A1* | 4/2017 | McNamee | H04L 12/4641 |
| 2017/0126492 A1* | 5/2017 | Law | H04L 41/0806 |
| 2017/0127427 A1* | 5/2017 | Claridge | H04W 72/085 |
| 2017/0208019 A1 | 7/2017 | Shimojou et al. | |
| 2017/0257870 A1* | 9/2017 | Farmanbar | H04W 24/08 |
| 2017/0311304 A1 | 10/2017 | Lu | |
| 2017/0346752 A1 | 11/2017 | Krishnamurthy et al. | |

FOREIGN PATENT DOCUMENTS

| | | |
|---|---|---|
| CN | 102427473 A | 4/2012 |
| CN | 102710508 A | 10/2012 |
| CN | 103052054 A | 4/2013 |
| CN | 103168445 A | 6/2013 |
| CN | 103369535 A | 10/2013 |
| CN | 103548370 A | 1/2014 |
| CN | 104243301 A | 12/2014 |
| CN | 104252390 A | 12/2014 |
| CN | 104270441 A | 1/2015 |
| CN | 104335639 A | 2/2015 |
| EP | 1729532 A1 | 12/2006 |
| EP | 2493235 A1 | 8/2012 |
| EP | 2627140 A1 | 8/2013 |
| EP | 2667541 A1 | 11/2013 |
| EP | 2866495 A2 | 4/2015 |
| GB | 2512900 A | 10/2014 |
| JP | 2009542091 A | 11/2009 |
| JP | 2011508474 A | 3/2011 |
| JP | 2013541289 A | 11/2013 |
| JP | 2014045390 A | 3/2014 |
| JP | 2014090501 A | 5/2014 |
| JP | 2015080204 A | 4/2015 |
| KR | 20130084680 A | 7/2013 |
| WO | 2009071431 A1 | 6/2009 |
| WO | 2011032595 A1 | 3/2011 |
| WO | 2011086250 A1 | 7/2011 |
| WO | 2011144538 A1 | 11/2011 |
| WO | 2013093462 A1 | 6/2013 |
| WO | 2013170045 A2 | 11/2013 |
| WO | 2014086978 A1 | 6/2014 |
| WO | 2014090997 A1 | 6/2014 |
| WO | 2014117135 A1 | 7/2014 |
| WO | 2014121471 A1 | 8/2014 |
| WO | 2014160228 A1 | 10/2014 |
| WO | 2014180513 A1 | 11/2014 |
| WO | 2014197778 A1 | 12/2014 |
| WO | 2015057960 A1 | 4/2015 |

OTHER PUBLICATIONS

European Search Report dated Nov. 22, 2017 for corresponding European patent application No. 16802559.1 filed Jun. 1, 2016.

International Search Report dated Jul. 15, 2016 for corresponding International Application No. PCT/CN2016/084398 filed Jun. 1, 2016.

International Search Report dated Jul. 18, 2016 for corresponding International Application No. PCT/CN2016/084405 filed Jun. 1, 2016.

International Search Report dated Aug. 4, 2016 for corresponding International Application No. PCT/CN2016/084401 filed Jun. 1, 2016.

(56) References Cited

OTHER PUBLICATIONS

International Search Report dated Jul. 28, 2016 for corresponding International Application No. PCT/CN2016/084396 filed Jun. 1, 2016.
International Search Report dated Aug. 8, 2016 for corresponding International Application No. PCT/CN2016/084399 filed Jun. 1, 2016.
International Search Report dated Nov. 14, 2016 for corresponding International Application No. PCT/CN2016/099726 filed Sep. 22, 2016.
NGMN 5G Initiative White Paper, A Deliverable by the NGMN Alliance, pp. 1-125, Feb. 17, 2015.
3GPP TR 23.707 V13.0.0 titled Technical Specification Group Services and System Aspects; Architecture Enhancements for Dedicated Core Networks: Stage 2, Dec. 2014.
3GPP TR 22.891 titled "Study on New Services and Market Technology Enablers".
ETSI GS NFV 001 titled "Network Function Virtualization (NFV); Use Cases".
ETSI GS NFV 002 titled "Network Function Virtualization (NFV); Architectural Framework".
Partial Supplementary European Search Report dated Apr. 19, 2018 for corresponding European Application No. 16802558.3 filed Jun. 1, 2016.
Liang et al., "Wireless Virtualization for Next Generation Mobile Cellular Networks", IEEE Wireless Communications, pp. 61-69, Feb. 1, 2015.
Liang et al., "Wireless Network Virtualization: A Survey, Some Research Issues and Challenges", IEEE Communications Surveys & Tutorials, vol. 17(1), Jan. 1, 2015.
Hamid Farmanbar et al.,"Traffic Engineering for Software-Defined Radio Access Networks", 2014 IEEE Network Operations and Management Symposium, May 5, 2014.
Extended European Search Report dated Feb. 27, 2018 for corresponding European Application No. 16802562.5 filed Jan. 6, 2016.
Extended European Search Report dated Mar. 1, 2018 for corresponding European Patent Application No. 16802560.9 filed Jun. 1, 2016.
Extended European Search Report dated Mar. 20, 2018 for corresponding European Application No. 16802556.7 filed Jun. 1, 2016.
ETSI GS NFV 002 V1.2.1 (Dec. 2014),Network Functions Virtualisation (NFV);Architectural Framework,total 21 pages.
Akihiro Nakao,"Virtualization Technology for Building New-Generation Networks",Virtual Node Project,NICT News,Jun. 30, 2010,total 12 pages.
Takuya Shimojyo, et al., Future Mobile Core Network for Efficient Service Operation, Network Softwarization, 2015 1st IEEE Conference on, Apr. 2015.
Tsuyoshi Ogura et al.,"A Study on Congestion Avoidance Technology using Multiple Virtual Networks", IEICE technical report, vol. 114 No. 28, May 8, 2014.

\* cited by examiner

SYSTEMS AND METHODS FOR DISTRIBUTING NETWORK RESOURCES TO NETWORK SERVICE PROVIDERS

CROSS-REFERENCE TO RELATED APPLICATIONS

This application claims the benefit of U.S. Provisional Application Ser. No. 62/222,645 titled "SYSTEMS AND METHODS FOR SHARING NETWORK CONNECTIVITY RESOURCES FROM $3^{RD}$ PARTY INFRASTRUCTURES" filed on Sep. 23, 2015, which is incorporated by reference herein in its entirety.

FIELD OF THE INVENTION

The present invention pertains to the field of network communications, and in particular, towards systems and methods for distributing network resources of a physical network infrastructure to network service providers.

BACKGROUND

As mobile communication networks have become more heavily relied upon, different usage patterns have evolved concerning devices connected to the network. Some types of devices only connect sporadically, and generate a small amount of traffic per device. However some networks have a large number of deployed devices, resulting in a large number of small messages being exchanged. The reliability of the connection in such a network deployment may not need to be very high. Other devices may connect with a need for higher capacity connections, while others may require ultra-reliable connections. Serving these various connection requirements is difficult using a single network with a defined architecture as it would require the entire network to support the most strenuous use cases for each connection.

Communication networks can also make use of technologies such as Network Function Virtualization (NFV), Software Defined Networking (SDN) in order to differentially serve the demands from mobile devices, such as User Equipment (UEs) connected to the network. In building advanced networks, such as those to support future developments in wireless networks (including next generation wireless networks, such as a Fifth Generation (5G) network), a common pool of network resources can be partitioned using network slicing techniques to provide an network operator with the ability to create isolated virtual networks over which different traffic flows with different requirements, can travel.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method for distributing and/or re-distributing connectivity resources of a physical network infrastructure between network service providers.

In accordance with embodiments of the present invention, there is provided a method of generating a soft schedule for the transmission of data to a User Equipment. The method includes receiving traffic to be scheduled for transmission and generating a soft schedule for the transmission of the received data in accordance with a resource allocation and the received traffic. The method further includes transmitting the soft schedule to a scheduler in an underlying network slice, for transmission to the UE.

According to some embodiments, the method further includes buffering a portion of the received traffic in accordance with an indication that the portion cannot be scheduled for transmission in a current transmission window. According to some embodiments, transmitting the soft schedule to the scheduler in the underlying network slice includes transmitting the data identified in the soft schedule to an entity in the underlying network slice.

In accordance with embodiments of the present invention, there is provided a scheduler including a processor and machine readable memory storing machine executable instructions which when executed by the processor configures the scheduler to receive traffic to be scheduled for transmission and generate a soft schedule for the transmission of the received data in accordance with a resource allocation and the received traffic. In addition when executed by the processor, the executable instructions cause the scheduler to transmit the soft schedule to a scheduler in an underlying network slice, for transmission to the UE.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
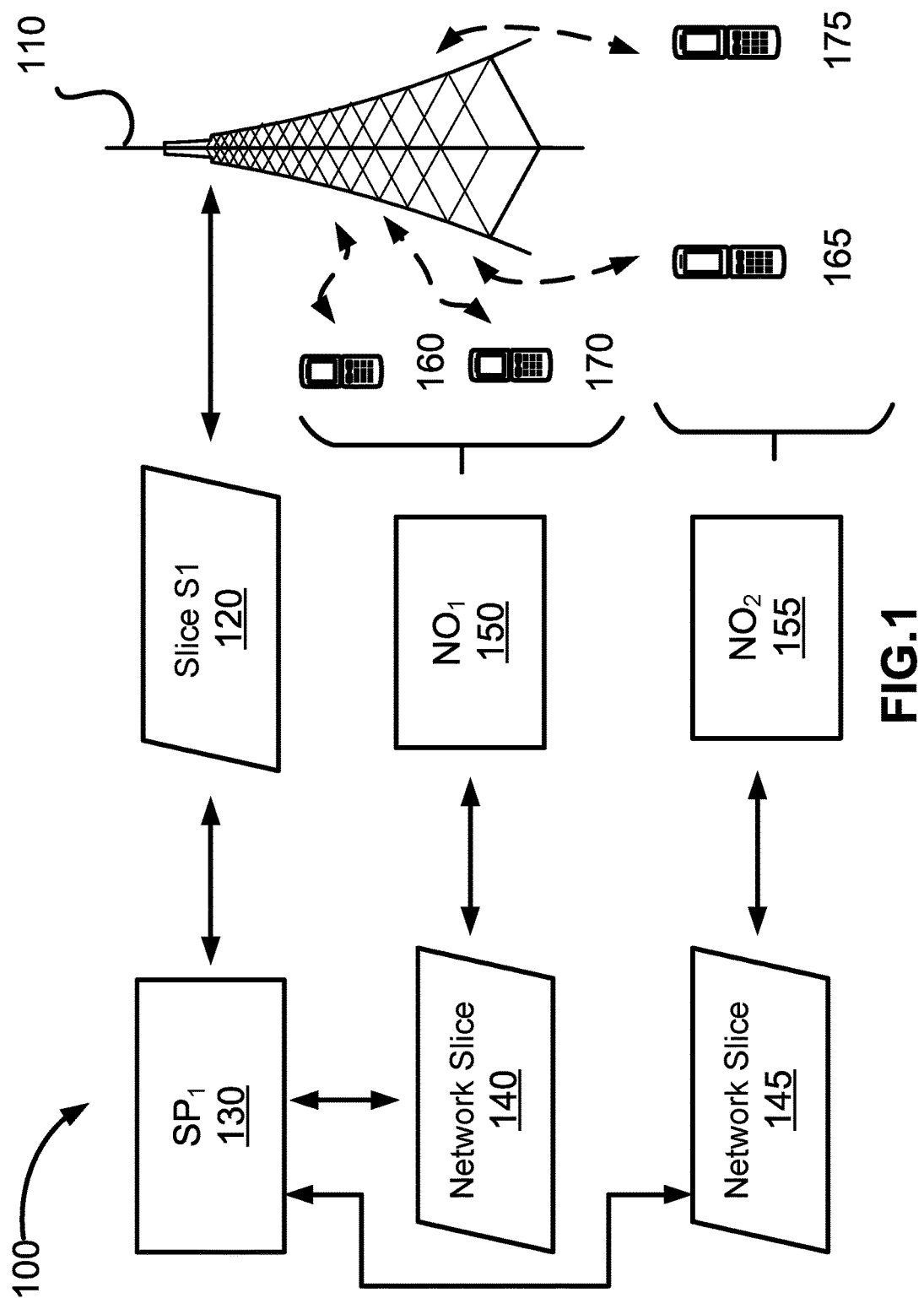
FIG. 1 illustrates a functional network architecture, according to an embodiment of the present invention.

Network slicing is a network management technique that allows for the creation of isolated virtual networks referred to as slices. A network slice is a logical collection of compute and connectivity resources that can be isolated from other nodes, allowing an administrator of a network within the slice to make decisions that are not impacted by decisions made in other slices. In discussions about successor networks to the existing 3G/4G mobile networks, network slicing is of great interest. In some discussions, different services can be supported in different slices of a mobile network. In other discussions, the infrastructure at the radio edge may not be fully owned by the mobile network operator. Some discussions have been directed to creating different roles for the owner of the underlying infrastructure (including radio resources), the provider of the telecommunication services, and the customer facing operators, referred to as Infrastructure Providers (InPs), Service Providers (SPs) and Network Operators (NOs) respectively. The resources controlled by an InP may be referred to as Physical Network Infrastructure (PNI). Further information on slices and NFVs associated with communication networks may be found in communication standards literature such as: 3GPP TR 22.891 titled "Study on New Services and Market Technology Enablers", ETSI GS NFV 001 titled "Network Function Virtualization (NFV); Use Cases", and ETSI GS NFV 002 titled "Network Function Virtualization (NFV); Architectural Framework", all of which are fully incorporated herein by reference.

The traffic flows carried by different slices can be isolated from flows in other slices. In some embodiments this can be performed by allocating a separate portion of the PNI's resources, including connectivity resources (i.e. use and control of the Network's channels, frequencies, monitoring/feedback/control functions, or bandwidth of the physical links between network nodes) and/or processing resources (e.g. use of the processors or controllers at network nodes) to each slice. This allows each slice to meet certain performance guarantees (e.g. Quality of Service (QoS) or Quality of Experience (QoE)) for the services they support, without affecting the performance of other slices. Slice isolation can further ensure that the traffic associated with each slice remains "unseen" and unknown to other slices.

An InP may allocate its resources in any number of different ways. As noted above, the InP may provide access to one or more SPs. An SP may further divide the resources of the InP among an number of NOs (or it may provide the resources to a single NO). Each of these allocations (the InP allocating resources to any number of SPs, and an SP allocating resources to any number of NOs) may be performed through creating slices of an underlying resource. In the case of the InP, an underlying resource is the physical resources available to it, while for an SP, the underlying resource is a slice of the resources of an InP (or an aggregation of slices from different InPs). Slices can be provided as either hard slices, or soft slices. To appreciate the difference between a hard slice and a soft slice, it should be understood that a hard slice clearly delineates the allocated resources. If an InP provides 50% of its overall resources in a hard slice to an SP, this could be the creation of a slice that allocates the SP half of the resource blocks in a given time window. This allocation may be the lowest half of a frequency block in each time window, all of the frequencies in a frequency block in every other time window, or some other fixed mapping. If an InP provides the same allocation in a soft slice, the SP may not have a guarantee of the specific resources that will be allocated to it. Due to the strict definition of the allocated resources associated with the hard slice, it is possible for an SP that has hard slices from an InP, to provide either hard or soft slices to NOs. An SP that receives a soft slices from an InP, can provide soft slices to an NO, but cannot make the resource allocation guarantees associated with a hard slice. It should be understood that the allocation of resources through a slice is often accompanied by a Service Level Agreement that specifies the type of resource allocation (hard or soft), and an outage guarantee that specifies how consistently the allocation is available, and may optionally specify penalties to the slice provider if resources are not available. It should also be understood that a slice can have a hard allocation as well as a soft allocation, so that there is a guarantee of some defined portion of the resources allocated to a slice, while the balance of the resources are provided in the form of a soft slice allocation.

As noted above, an InP may create a slice that contains an allocation of some or all of its connectivity resources to a primary entity (for example, a service provider). If the primary entity receives the resources as a hard slice, it may be possible to provide the primary entity both access to and control of its allotment of connectivity resources on the PNI. The primary entity may then further redistribute the resources associated with the slice to other secondary entities (for example, Network Operators). Such a multi-layered approach to slicing allows an NO to avoid having to interact with a large number of infrastructure providers who may have relatively small or limited networks of infrastructure, and it allows an NO to serve its end-users when they are connected to the PNI It should be noted, that conventional soft slicing does not provide control of the underlying resource.

In conventional third and fourth (3G/4G) mobile communication networks, a network operator has control over the physical resources at the radio edge of the network. In basestations (often referred to as a NodeB or an enhanced NodeB (eNodeB)), the control is used by a scheduler, which allocates resource blocks in the time-frequency domain, to schedule data for transmission to a UE. In a network that is built upon network slicing, a hard slice can allow for a scheduler that can design a schedule for the resources of the underlying network. However, with a soft slice, there is no guarantee of the particular resources that are allocated to a slice in a particular time window (for example on a per-Transmission Time Interval (TTI) basis). This restricts (or eliminates) the ability of an entity within a slice to perform resource control functions, such as scheduling or power control, on the underlying resource. The ability to schedule underlying resources in a soft slice, and the ability to provide control of resources to entities within soft slices, would allow greater flexibility in the design of next generation networks.

Referring to FIG. 1, there is shown a functional network architecture 100, according to an embodiment of the present invention. The network architecture 100 includes a physical network infrastructure (PNI) 110 under the control of an InP. The InP has allocated resources from the PNI 110 (e.g. use of its physical links, bandwidth across links, communication channels, frequencies, resource blocks, etc. . . . ) to a first Service Provider (SP), $SP_1$ 130, via Slice S1 120. $SP_1$ 130 is a primary entity, which has partitioned its allocation of resources from the PNI 110 (via Slice S1 120) to two secondary entities, namely: a first Network Operator ($NO_1$) 150 via Slice 140, and a second network operator ($NO_2$) 155 via Slice 145. As shown, $SP_1$ 130 uses Slice 120 as a set of underlying resources and provides slices 140 and 145 to $NO_1$ 150 and $NO_2$ 155 respectively, $NO_1$ 150 uses the resources of Slice 140 to offer services to its end users while $NO_2$ 155 uses the resources of Slice 145 to offer services to its end users. $NO_1$ 150 provides services to UEs 160, 170, which can connect to $NO_1$ 150 through radio resources provided by the PNI 110 (for example, via wireless radio link). Those skilled in the art will appreciate that UEs 160 and 170 being associated with $NO_1$ 150 can be understood as UEs 160 and 170 being associated with subscriptions to the services offered by $NO_1$ 150. Similarly, $NO_2$ 150 provides service to UEs 165, 175, which can also connect through the PNI 110. Under this architecture 100, for example, UE 160 can connect to the Access Points (APs) at the radio edge of PNI 110. The service requests associated with UE 160 are associated with $NO_1$ 150, and are either carried out by entities within $NO_1$ 150, or in some embodiments may be carried out by entities within $SP_1$ 130.

In the embodiment illustrated in FIG. 1, PNI 110 includes at least one Access Point (AP) sufficient to establish the necessary physical links (e.g. via radio communications or wireless interface) to carry out transmissions (e.g. traffic) involving UEs 160, 165, 170, 175. While FIG. 1 depicts PNI 110 comprising a single AP, PNI 110 may comprise any number and combination of nodes, APs, routers, base stations, nodeBs, evolved-nodeBs, and so forth in other embodiments (not shown). Accordingly, PNI 110 may be a Radio Access Network (RAN) serving a plurality of SPs, each of which can provide resources to support a plurality of NOs.

As indicated above, $SP_1$ 130 is an intermediate entity which obtains or acquires resources from PNI 110. $SP_1$ 130 may in some embodiment have additional resources, or access to additional resourced from other InPs. These additional resources can include compute resources away from the network edge, and may be used to instantiate network functions that provide services to underpin the network services in a slice provided to a network operator. $SP_1$ 130 may directly manage its acquired resources of the PNI 110 (e.g. maintain control of link activation and scheduling). For example, $SP_1$ 130 may manage the physical links of Network infrastructure 110 in order to enable traffic (i.e. the flow of data) involving UEs 160 and 170, when it is provided with a hard slice of the resources of PNI 110. The operational requirements of the resources underlying Slice S1 120 are typically defined by a Service Level Agreement (SLA) between $SP_1$ 130 and the owner of PNI 110. Because each entity receiving a slice, wants to control the resources it is provided, a mechanism for control to be provided within both hard and soft sliced environments would enhance the control available to a network operator that deploys a network within a slice (or a service provider that obtains resources from other entities within a slice).

$NO_1$ 150 and $NO_2$ 155 are network operators which indirectly rely upon the resources of the PNI 110 (e.g. use of PNI 100's links) from $SP_1$ 130 via Slices 140 and 145, respectively. From the perspective of $NO_1$ 150, $SP_1$ 130 has a set of resources (allocated via slice S1 120) and creates Slice 140 specifically for $NO_1$ 150 to have a degree of isolation from $NO_2$ 150. $NO_1$ 150 does not directly interact with the InP that provides PNI 110. The resources allocated to $NO_1$ 150 (via Slice 140) allow it to serve the requests of its subscribers (e.g. UEs 160 and 170) over the PNI 110. For example, $NO_1$ 150 may comprise a local enterprise (e.g. Alarm or Sensor Company, Police or Fire department, distribution company, etc.) having an associated end user population of UEs 160, 170. These UEs 160, 170 may attach to $NO_1$ 150 through the resources of PNI 110. Accordingly, $NO_1$ 150 obtains resources through Slice 140 from SP 130, whose resources it turn are obtained from an InP as Slice S1 120 of PNI 110. The resources allocated to $NO_1$ 150 through Slice 140 may also be provisioned in accordance with an SLA between $SP_1$ 130 and $NO_1$ 150. A similar relationship is defined for $NO_2$.

It should be understood by those skilled in the art that while $SP_1$ 130, $NO_1$ 150, $NO_2$ 155 and the InP providing PNI 110 are depicted in FIG. 1 as distinct entities, in some embodiments, an NO and an SP may be an integrated function entity, while in other embodiments an SP and an InP may be the same entity. There is no requirement for an entity providing underlying resources to provide its resources to more than one logical entity above it.

Figure 2:
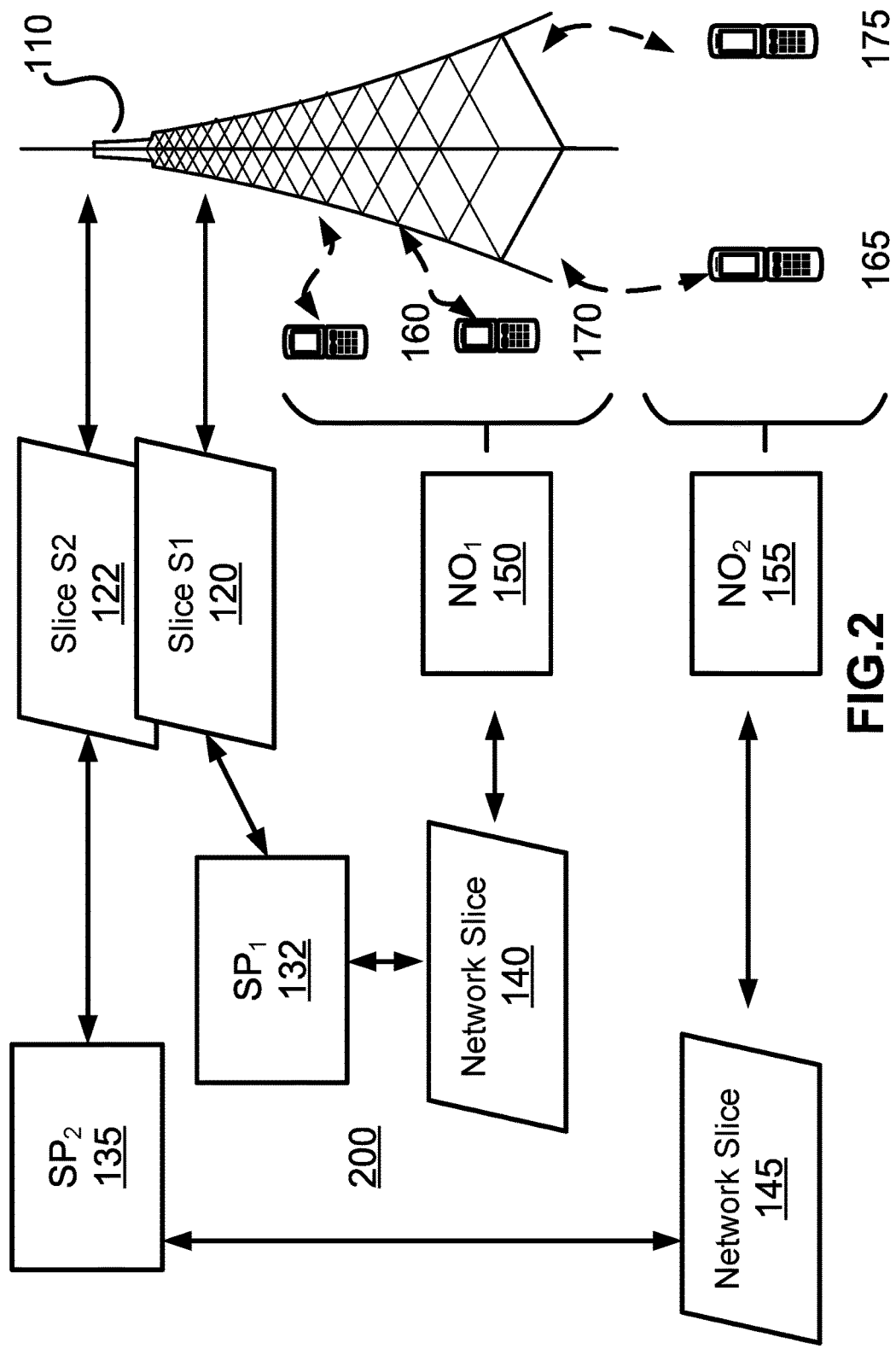
FIG. 2 illustrates another functional network architecture, according to an embodiment of the present invention.

Referring to FIG. 2, there is shown another functional network architecture 200, according to an embodiment of the present invention. Network architecture 200 of FIG. 2 is similar to the architecture 100 shown in FIG. 1, except in that PNI 110 has partitioned its resources to two SPs: $SP_1$ 130 and $SP_2$ 135 via Slices S1 120 and S2 122, respectively. $SP_1$ 130, in turn, provides $NO_1$ 150 with the underlying resources it requires to provide services to UEs 160 and 170 via Slice 142. $SP_2$ 135, provides $NO_2$ 150 with the underlying resources it requires to provide services to UEs 165 and 174 via Slice 147. Accordingly, FIG. 2 illustrates how a PNI may partition and allocate control and access of its connectivity resources amongst a plurality of SPs through the use of slices allocated to different SPs.

The manner in which the InP provides resources of PNI 110 to $SP_1$ 130 and $SP_2$ 135 through Slices S1 120 and S2 122 is typically defined by a Service Level Agreement (SLA) between the InP and each SP. From the perspective of an NO, a virtualized representation of a radio edge AP will be instantiated within the slice it receives from an SP. From within the slice, the AP appears just as a physical AP would if the NO owned the infrastructure. In a 3G/4G network, an AP would be a NodeB or an eNodeB. Within the eNodeB is a scheduler receives downlink traffic demands and schedules the traffic to each UE. As noted above, within the service area of an InP, there are likely to be a plurality of different APs. Scheduling transmissions to individual UEs, is often not simply a matter of selecting a resource block (a time window—frequency band pairing) for each UE. When a UE is just outside the coverage area of a second AP, improved transmission metrics can be achieved by ensuring that the second AP is not transmitting a signal that will generate too much interference for the target UE at the time that the primary AP is transmitting to the target UE. This is a simplified definition of Power Control, which those skilled in the art will appreciate to have other factors involved. Nonetheless, it should be understood that in existing 3G/4G networks, scheduling and power control can be performed in an intertwined manner. However, in an environment in which a soft slice is the basis for the NO's network, scheduling cannot be done on a per-RB basis, and thus power control also becomes more difficult, as it is not possible to indicate to a second AP, which RB the first AP will be transmitting in.

In addition, it must be understood, that due to the use of SLAs, even a hard slice does not have a guarantee of the defined allocation of RBs in each time window. An outage guarantee in an SLA typically indicates that the contracted services will be delivered with a defined outage rate. For example, 25% of the resources of an InP could be assigned to an SP (or 25% of an SPs resource could be assigned to an NO in a comparable example). If the 25% is a hard slice, it could be a fixed set of RBs over a set of TTIs, with a repeating pattern; in a soft slice, it would simply be for 25% of the overall RBs in a set of TTIs. But if the outage guarantee was for 95% reliability, in 1 out of 20 sets of TTIs, the hard slice would not get the promised allotment. In the soft slice scenario it could be even more of a problem, in that not only would allocation be subject to the outage guarantee, but the RBs within a set block of TTIs may not be arranged in a way that suits the immediate demands. For at least these reasons, providing suitable control functions to entities within a slice (even a hard slice) has problems that are not analogous to the problems in scheduling in conventional 3G/4G networks.

While the above discussion centered on the uncertain nature of the resources available to a slice, it is also helpful, to examine the issues arising from the perspective of the entity providing the underlying resources. As the above discussion could be viewed as either the needs of an NO relying upon an SP, or an SP relying upon an InP, the following discussion examines the perspective of an SP providing services to a set of NOs, and could also be applied to an InP providing PNI resources to SPs. If an SP has a set of available resources, for this example the resources are assumed to be radio access resources but other resources could also be subject to these issues, the objective is to provide these resources to a sufficient number of NOs so that all the available resources are consumed. Maximizing consumption of the available resources is typically the most direct manner to maximizing profits. Contracting with NOs to use all the available RBs, will not necessarily maximize the RB usage. If 100% of the resources are provided to NOs, then 100% of the RBs available at a given time are only used if all the NOs are at full capacity. To ensure RB utilization, it is often desirable to oversell the underlying resources. Multiplexing the demand of a plurality of different NOs, with different usage characteristics can be done with a statistical likelihood that at any given time, there is a sufficiently low probability of over commitment. The likelihood of over commitment (or over selling) of the underlying resource can be largely accounted for through the outage guarantees, and the ability to pay an NO a penalty if the outage guarantees are exceeded. This model of network resource allocation can create an incentive for either the InP or the SP to provide soft slices, as the commitments are often easier to fulfill. Hard slicing of makes it difficult to efficiently distribute resources, or dynamically modify or re-allocate resources based on changing demands (e.g. resource requirements). Even in situations without oversubscription to the resources, to maximize usage of the underlying resources is still desirable. Suppose Slices S1 120 and S2 122 each have been initially allocated a 50% share of PNI 110's resources. However, should $SP_1$ 130 determine it requires only 40% of PNI 110's resources to meet its demands for a certain set of TTIs, and $SP_2$ 135 has sufficient traffic demands to use the extra 10% of the PNI resources, without a mechanism for effectively re-allocating surplus resources to other SPs, the InP is not able to maximize its utilization of the underlying resource.

To address the needs, both of the slice creator who is incentivized to maximize usage of the underlying resources, and the slice consumer who is well served through the ability to control the underlying resources even in a soft sliced environment, in embodiments of the present invention, there is provided a mechanism for slice consumers to carry out functions such as scheduling and power control on the full set of available resources. In other aspects of the present invention, mechanisms are provided for slice creators to received input from the slice consumers that can be used in the control of the underlying resource, and so that each of the slice consumers can be provided with an opportunity to use all of the available resources at a given time.

Figure 3:
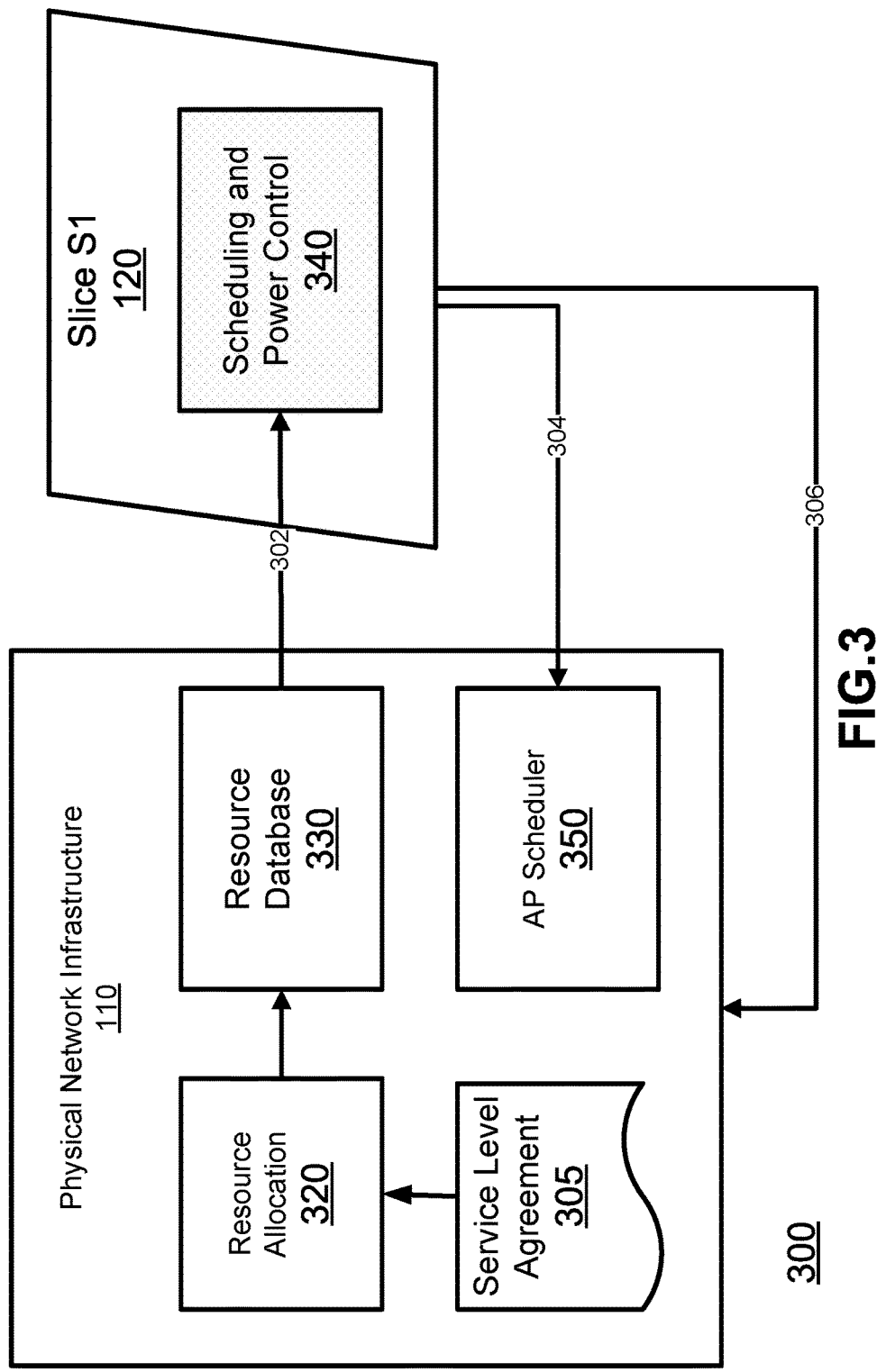
FIG. 3 is a functional representation of a Network Slice, according to an embodiment of the present invention.

Referring to FIG. 3, there is shown a functional resource control model 300 between PNI 110 and Slice S1 120 of FIGS. 1-2, according to an embodiment of the present invention. The functional resource control model 300 may, for example, be used to determine and allocate a portion of PNI 110's resources to SP 130 (via Slice S1 120) through a resource database, re-acquire surplus resources not required by SP 130 on a short term or long term basis, and re-allocate additional resources if required by SP 130, in certain embodiments. The model 300 may also allow for resources of PNI 110 that are not not being used by other slices to be offered to slice S1 120 on a short term basis. As shown in FIG. 3, PNI 100 includes a Service Level Agreement (SLA) 305 which defines parameters of the resource allocation to each of the slices supported by PNI 110, a Resource Allocation (RA) function 320, a resource database 330, and an Access Point (AP) scheduler 350. Slice S1 120 includes a Scheduling and Power Control (SPC) function 340. SLA 305 sets out various resource allocation and cost particulars negotiated between the owner of the PNI 110 and SP 130, In one example, the SLA 305 may define the initial resources to be allocated to the slice, the cost of the initial resources, the cost of additional resources not included in the initial allocation, the ability of the PNI to re-distribute surplus resources, and so forth. RA 320 determines the portion of PNI 110's resources to allocate to SP 130 (via Slice S1 120), for example, based on the SLA 305. Input 306 received from Slice S1 120 can be used as an input to both the RA 320, which may indicate a need to change the allocated portion. Resource Database 330 stores an indication of the resources allocated to Slice S1 120 as determined by RA 320. SPC function 340 determines scheduling and power control (to control interference, for example) between various radio links of the PNI 110, using the portion of resources allocated to Slice S1 120. Finally, AP Scheduler 350 executes scheduling on PNI 110's access points to activate links in accordance with requested schedules received from an SPC function 340 via control signal 304, along with any other received schedule.

Notably, the provision of RA 320, and resource database 330 connected to an entity within Slice S1 120, allows for dynamic modification or allocation of PNI 110's resources based on changing needs of Slice S1 120. For example, should Slice S1 120 later determine it requires additional resources to meet increased service demands for a short period of time, it can provide a request for increased resources to RA 320 via input 306, which in turn may re-allocate additional resources to Slice S1 120 via resource database 330. Alternatively, should it be determined that Slice S1 120 can release some of the allocated resources, it can provide an indication of surplus resources RA 320 via input 306, which in turn may re-acquire the surplus resources by reducing the resource allocation to Slice S1 120 in resource database 330. Therefore, functional resource control model 300 provides a mechanism to allow a slice to either temporarily increase or decrease the allocated resources. Those skilled in the art will appreciate that this control model can also represent the interworkings of an NO and SP if PNI 110 is instead represented by $SP_1$ 130 and the slice is network slice 140.

Figure 4:
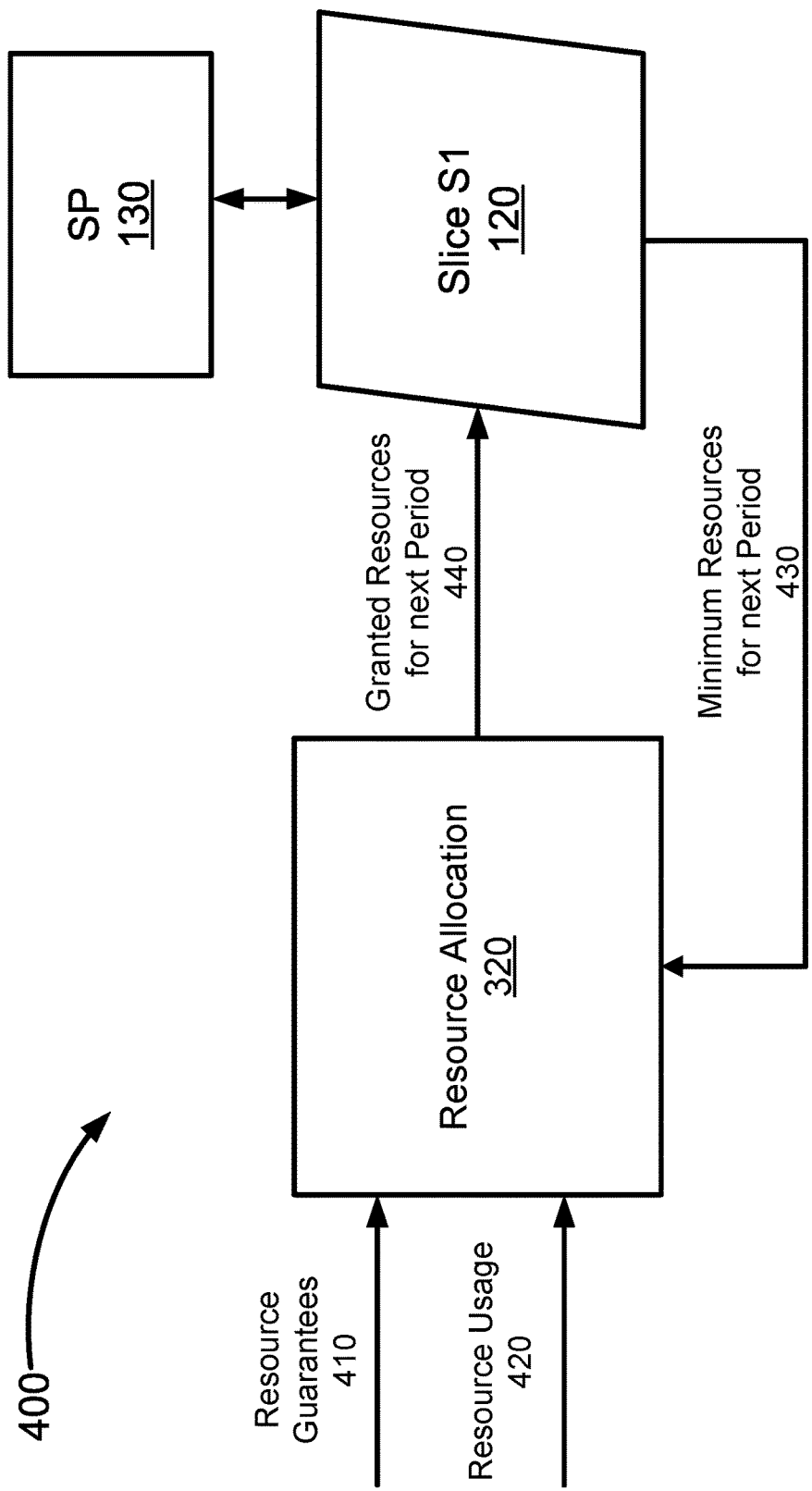
FIG. 4 is a functional representation of a Resource Assignment entity granting network resources to a Service Provider, according to an embodiment of the present invention.

Referring to FIG. 4, there is shown a functional resource control model 400 between PNI 110 and SP 130 (via Slice S1 120) of FIGS. 1-2, according to another embodiment of the present invention. Those skilled in the art will appreciate that a resource assignment entity could also be instantiated within a slice such as slice S1 120 so that this model could also be used between an SP and an NO. This model can be used to allow for changes to allocated resources to accommodate the slice providing an indication of a future demand. Functional resource control model 400 may be applied, for example, when Slice S1 120 comprises a soft slice having more flexibility in the receipt of resources over a given interval. RA 320 dynamically provides a grant 440 of a portion of PNI 110's resources to SP 130 (via Slice S1 120) for an upcoming operational period (for example, an upcoming TTI). The RA 320 may determine the granted portion based on resource guarantees 410 (for example, from an SLA between PNI 110 and SP 130), resource usage information 420 (for example, based on current traffic over entire PNI 110, or traffic solely associated with SP 130), and the minimum resources required 430 by Slice S1 120 over the next operational period. Accordingly, this functional resource control model allows RA 320 to dynamically determine resource allocation to SP 130 on every interval based on a number of static and dynamically changing factors.

Figure 5:
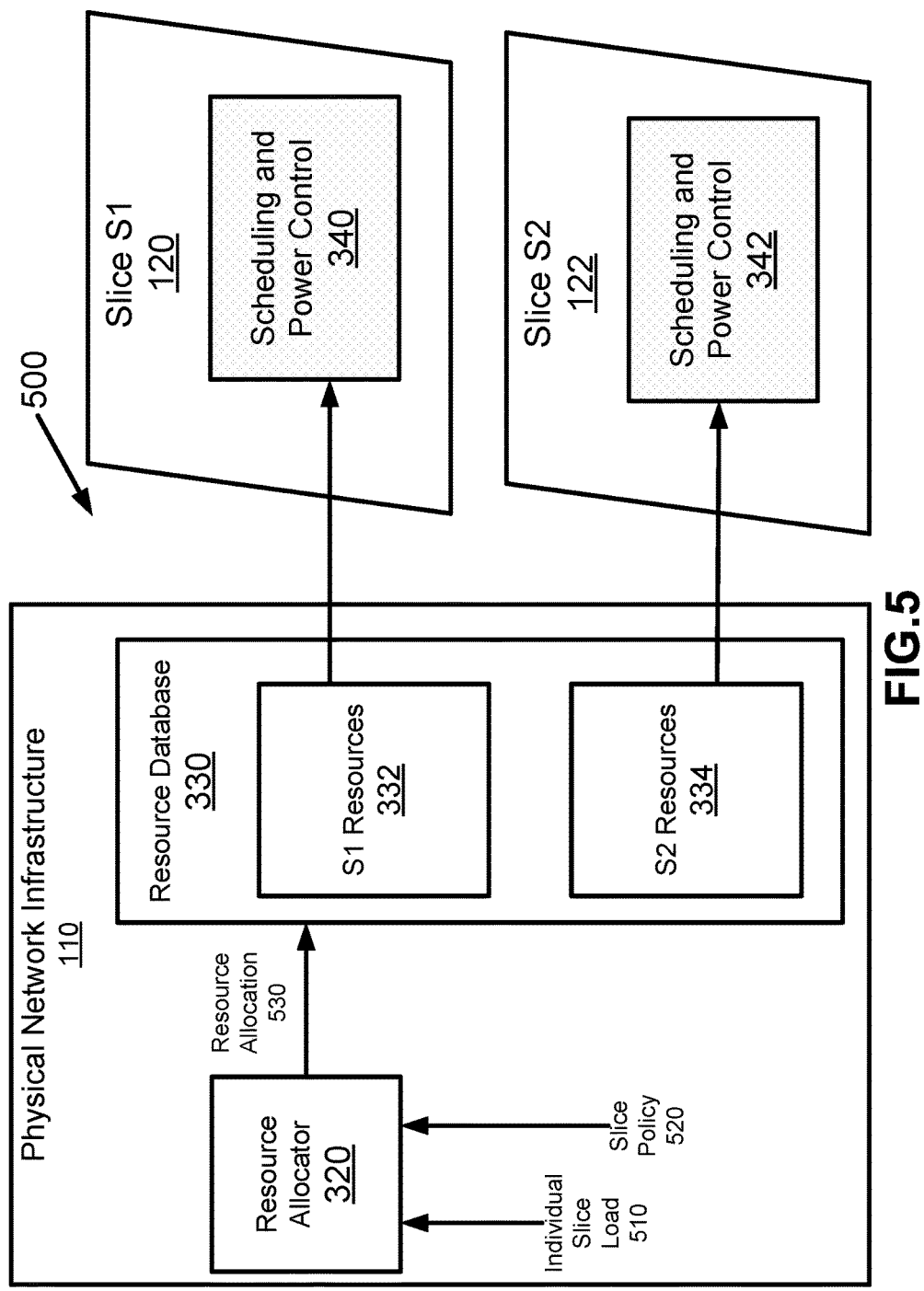
FIG. 5 is a functional representation of a Resource Assignment entity allocating network resources to a Resource Database, according to an embodiment of the present invention.

Referring to FIG. 5, there is shown a functional resource control model 500 between PNI 110 and Slices S1 120, and S2 122 of FIG. 2, according to an embodiment of the present invention. As with the above discussions, this model could also represent the interactions between an SP and a set of NOs. PNI 110 includes an RA 320, and a resource database 330 which includes a registry 332 of the resources allocated to slice S1, and a registry 334 of the resources allocated to slice S2. Slice S1 120 includes a SPC function 340 which can manage services using the portion of resources allocated by RA 320 in accordance with S1 resource registry 332, while Slice S2 122 includes SPC function 342 which manages services using the portion of resources allocated by RA 320 in accordance with S2 resource registry 334. In operation, RA 320 determines a portion of PNI 110's resources to Slice S1 120 and Slice S2 122 in accordance with the individual slice load 510 (e.g. traffic) and slice policy 520 (e.g. from an SLA) for each of Slices S1 and S2. RA 320 then allocates the determined portions of PNI 110's resources to each of Slices S1 and S2 and sends an indication 430 of each allocation to S1 resource registry 332, and S2 resource registry 334, respectively. SPC functions 340 and 342, are in turn operable to manage respective services (i.e. traffic flows) using the portion of the underlying resources as indicated in resource registries 332 and 334, respectively. Accordingly, resource database 330 provides a centralized repository containing updated resource allocations to each of Slices S1 and S2, as RA 320 dynamically varies resource allocations to each slice based on changing demands and/or loads. For example, if Slice S1 experiences an increase in traffic, and Slice S2 has a surplus of resources, RA 320 can determine the load/traffic changes associated with each Slice, and may allocate the surplus resources from Slice S2 to Slice S1 to meet its increased demand.

Figure 6:
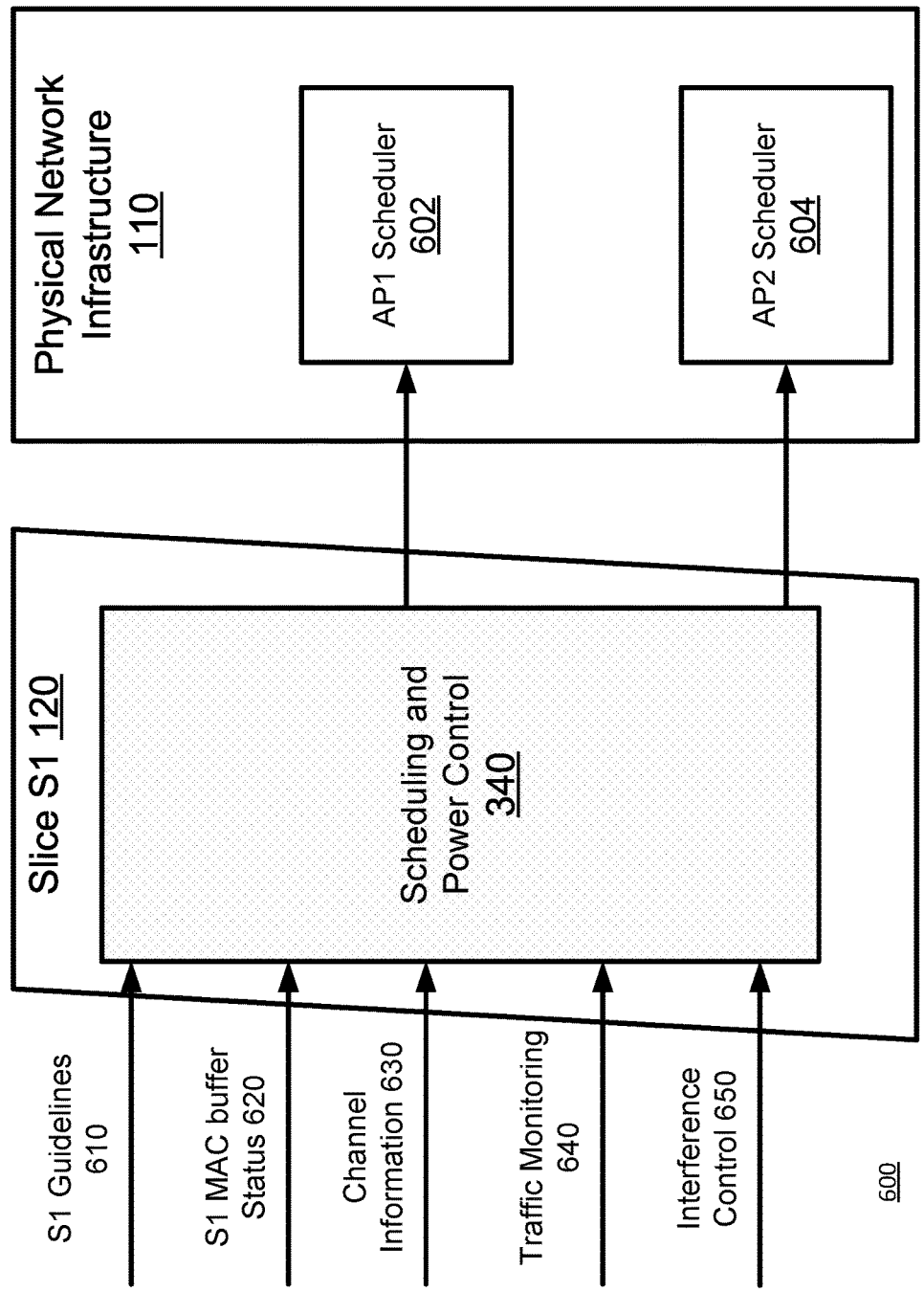
FIG. 6 is a functional representation of the Scheduling and Power Control entity shown in FIG. 5 used for scheduling activation of links at various Access Points, according to an embodiment of the present invention

Referring to FIG. 6, there is shown an exemplary functional scheduling model 600 between Slice S1 120 and PNI 110 of FIGS. 1-2. Those skilled in the art will appreciate that SPC 340 can be within an NO, and communicate with AP schedulers within an SP. Such an embodiment can be combined the embodiment illustrated in FIG. 6 to allow an NO to feed scheduling requests down towards the PNI, which may be through a series of SPs. Slice S1 120 includes a SPC function 340 which determines the scheduling of transmissions to the UE. By controlling the ordering of transmissions and power control of links between various APs and the UEs. The SPC 340 generates a desired schedule in accordance with a number of different factors. These factors can include the traffic demands generated by the slices underlain by slice S1 120. These traffic demands may include the S1 MAC buffer statuses 620 for each AP represented in S1, as well as traffic monitoring information 640. In addition to the traffic demand information, SPC 340 can also account for the parameters 610 of slice S1 (including the allocation of PNI resources as defined by SLAs), as well as radio channel information 630. Radio channel information 630, along with the geographic distribution of the APs in the PNI 110, along with the intended scheduling information can be used to determine expected interference for each UE. Based on this information, Interference Control information 650 can be determined and provided to SPC 340. Interference control information 650, and the channel information 630 can be used to determine a power control strategy. The scheduling and power control strategy can be provided to the PNI 110, and as illustrated may be provided to the schedulers within each of AP1 and AP2. AP1 scheduler 602 and AP2 scheduler 604 determine the scheduling of transmissions to UEs for each of AP1 and AP2. The scheduling of transmissions from each AP may be done at the AP, or it may be done centrally to allow for benefits of coordinated scheduling. The schedule determined by SPC 340 can be provided to the AP schedulers as an input to allow for the final schedule to be determined. It should be understood that an output like that of SPC 340 will be generated for each slice supported, as will be discussed below in FIG. 7

Figure 7:
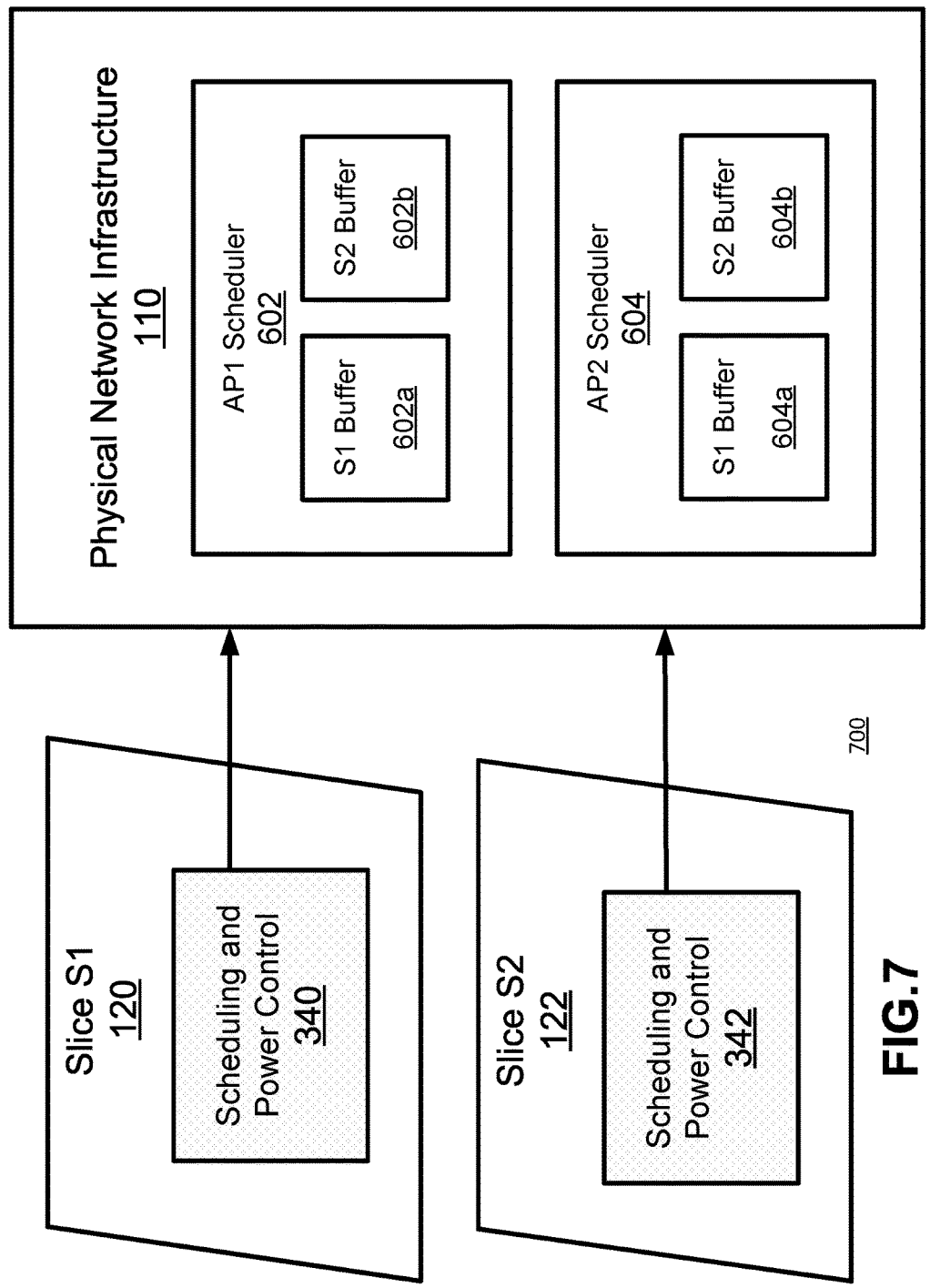
FIG. 7 is a functional representation of the Scheduling and Power Control entities shown in FIG. 5 used for scheduling activation of links at an Access Point via an Access Point Scheduler, according to an embodiment of the present invention

Referring to FIG. 7, there is shown a functional scheduling model 700 between Slices S1 120 and S2 122, and PNI 110 of FIG. 2, according to another embodiment of the present invention. As noted above, this could also be a model for the interaction between a plurality of NOs and a single SP. Scheduling model 700 of FIG. 7 is similar to scheduling model 600 of FIG. 6, except in that it includes an additional Slice S2 122 attempting to schedule links using assigned resources on the PNI 110. AP1 scheduler 602 includes S1 Buffer 602*a* and S2 Buffer 602*b* for storing/buffering scheduling data from Slices S1 120 and S2 122, respectively. Similarly, AP2 scheduler 604 includes S1 Buffer 604*a* and S2 Buffer 604*b* for storing/buffering scheduling data from Slices S1 120 and S2 122, respectively. SPC functions 340, 342 of Slices S1 120 and S2 122, respectively, are operable to determine scheduling and power control of links of the PNI 110 in order to manage respective services. Those skilled in the art will appreciate that in embodiments where allocations of radio edge resources have been made in advance, the size of the S1 and S2 buffers at an AP can be varied along with the allocation of the radio edge resources. By allowing dynamic changes in the allocations, each supported slice can be treated as a changing hard slice. This allows the scheduling and power control to be pushed up to the slice for the allocated RBs. Where the model 700 is applied to an SP and NO, the SPC functions can be pushed to the NO. This allows a network operator to get control of the scheduling and power control, much as it is in 3G/4G networks.

Figure 8:
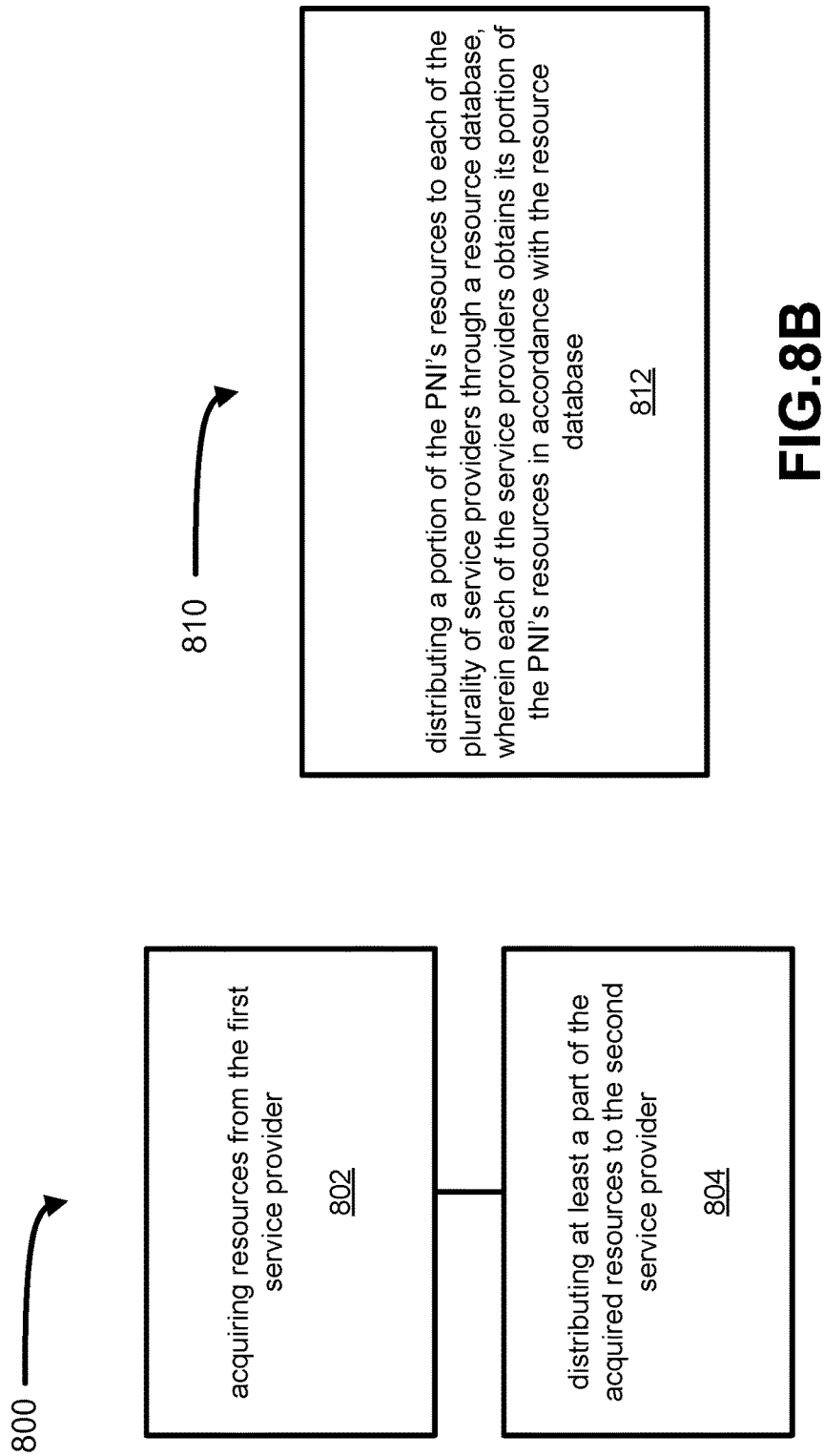
FIG. 8A is a flow chart illustrating a method for distributing network resources to network service providers, according to an embodiment of the present invention
FIG. 8B is a flow chart illustrating a method for distributing network resources to network service providers, according to an embodiment of the present invention.

Referring to FIG. 8A, there is shown a flow chart illustrating a method 800 for re-allocating resources of a physical network infrastructure (PNI) between a plurality of service providers including a first service provider and a second service provider. The first and second service providers may have been pre-allocated a portion of the PNI's resources. Method 800 may be carried out by RA 320 or PNI 110 any of the preceding functional network architectures, for example. At step 802, resources from the first service provider are acquired. At step 804, at least a part of the acquired resources are distributed to the second service provider.

As an illustrative example, the PNI may have initially allocated a portion of its resources to each SP through respective slices, to have control over these resources for a given period. If one of the SPs subsequently determines that it has surplus resources for the given period, PNI may at step 802 re-acquire the surplus resources from the SP. The PNI can then query other SPs to determine whether they would require additional resources over the same period, and if so, at step 804 re-distribute control of some or all of the surplus resources to a particular SP. In this way, the PNI acts as an intermediary between multiple SPs to facilitate the exchange of surplus/excess resources. The resources may be arranged by time intervals to permit distribution of resources, and re-allocation of surplus resources in a scheduled manner. Returning control over a set of resources that can be re-allocated to another SP, may be a trigger for a reduction in charging in some scenarios.

As another illustrative example that may be used with the network architecture illustrated in FIG. 2, PNI 110 may initially provide each of SP 130 and SP 135 Slices 120 and 122 (comprising respective "hard" slices) each having control capability of 50% of PNI 110's resources over the next y TTIs. Accordingly, PNI 110 will have no additional resources available over the next y TTIs as they have been pre-allocated to SPs 130 and 135 for this duration. However, if SP 135 later determines that it only requires 30% of the PNI 110's resources over the next y TTIs, PNI 110 can re-acquire control of the 20% surplus resources from SP 135. PNI 110 may then offer this 20% surplus to SP 130 over the next y TTIs. In this way, any surplus resources from one of SPs 130, 135 over a given interval may be re-allocated to another SP to more efficiently utilize PNI 110's connectivity resources.

In certain embodiments of method 800, the first and second service providers may be each allocated portions of the PNI's resources through respective first and second network slices. The resources acquired from the first service provider in step 802 are acquired through the first network slice, and the part of the acquired resources that are distributed to the second service provider in step 804 are performed through the second network slice. In certain embodiments, the resources from the first service provider may be acquired through a resource database (such as that shown in FIGS. 3 and 5), and the part of the acquired resources that are distributed to the second service provider through the resource database. The acquired resources may comprise surplus resources of the first service provider. In certain embodiments, method 800 may further comprise receiving an indication from the first service provider that is has surplus resources, wherein the acquired resources in step 802 are the surplus resources obtained in response to the indication.

In certain embodiments, method 800 may further comprise receiving an indication from the second service provider that it requires additional resources, wherein the part of the acquired resources are distributed in response to the indication. In some embodiments, method 800 may further comprise determining surplus resources of the first service provider, wherein the acquired resources from the first service provider comprises the determined surplus resources. The surplus resources of the first service provider may be determined in accordance with a slice policy of the first network slice and a slice load of the first network slice. In certain embodiments, method 800 may further comprise initiating a bidding process between the plurality of service providers for the acquired resources from the first service provider, wherein the part of the acquired resources is distributed to the second service provider when the second service provider wins the bidding process.

Referring to FIG. 8B, there is shown a flow chart illustrating a method 810 for allocating resources of a physical network infrastructure (PNI) between a plurality of service providers. Method 810 may be applied by RA 320 described above, for example. At step 812, a portion of the PNI's resources are distributed to each of the plurality of service providers through a resource database, wherein each of the service providers obtains its portion of the PNI's resources in accordance with the resource database. In this way, RA 320 can dynamically update the resource database to re-allocate PNI's resources more effectively and/or efficiently.

In certain embodiments, the portion of the PNI's resources distributed to each service provider may be determined in accordance with a service level agreement between the PNI and each service provider. In certain embodiments, method 810 may further comprise updating the resource database to redistribute allocation of the PNI's resources between the plurality of service providers. The resource database may comprise a registry for each of the plurality of service providers, each registry indicating the portion of resources allocated to each service provider. In certain embodiments, method 810 may further comprise providing an indication to each of the plurality of service providers of available resources from the PNI, and when a service provider responds with a request for the available resources, updating the resource database to provide the service provider with the available resources.

In certain embodiments, method 810 may further comprise providing a request to each of the plurality of service providers for surplus resources, and when a service provider responds with an indication of surplus resources, updating the resource database to re-acquire the surplus resources from the service provider.

Figure 9:
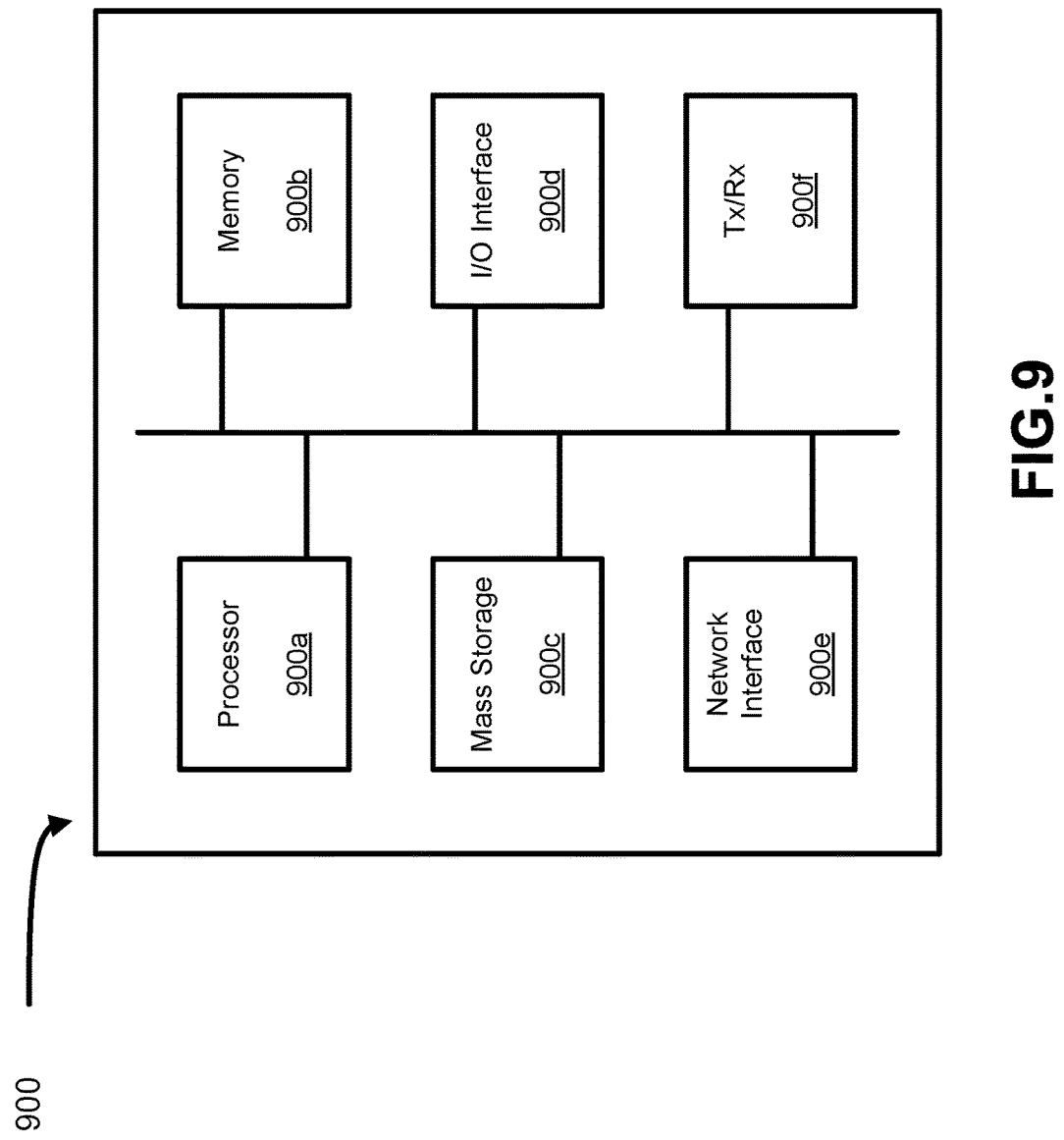
FIG. 9 is a schematic diagram of a hardware device according to an embodiment of the present invention.

In certain embodiments, method 810 may further comprise acquiring surplus resources from a first service provider through the resource database, and distributing at least a part of the surplus resources to a second service provider through the resource database Referring to FIG. 9, there is shown a schematic diagram of a hardware device 900 that may for example, comprise inter alia any or all of the RA 320, resource database 330, and SPC functions 340, 342, described above according to certain embodiments. Moreover, the hardware device 900 may be used to perform any or all of steps of method 800 in FIG. 8 and features described herein, according to different embodiments of the present invention.

As shown in FIG. 9, the hardware device 900 includes a processor 900a, memory 900b, non-transitory mass storage 900c, I/O interface 900d, network interface 900e, and a transceiver 900f, all of which are communicatively coupled via bi-directional bus. According to certain embodiments, any or all of the depicted elements may be utilized, or only a subset of the elements. Further, hardware device 900 may contain multiple instances of certain elements, such as multiple processors, memories, or transceivers. Also, elements of the hardware device may be directly coupled to other elements without the bi-directional bus.

The memory 900b may include any type of non-transitory memory such as static random access memory (SRAM), dynamic random access memory (DRAM), synchronous DRAM (SDRAM), read-only memory (ROM), any combination of such, or the like. The mass storage element 900c may include any type of non-transitory storage device, such as a solid state drive, hard disk drive, a magnetic disk drive, an optical disk drive, USB drive, or any computer program product configured to store data and machine executable program code. According to certain embodiments, the memory 900b or mass storage 900c may have recorded thereon statements and instructions executable by the processor 900a for performing any of the aforementioned method steps described above.

Figure 10:
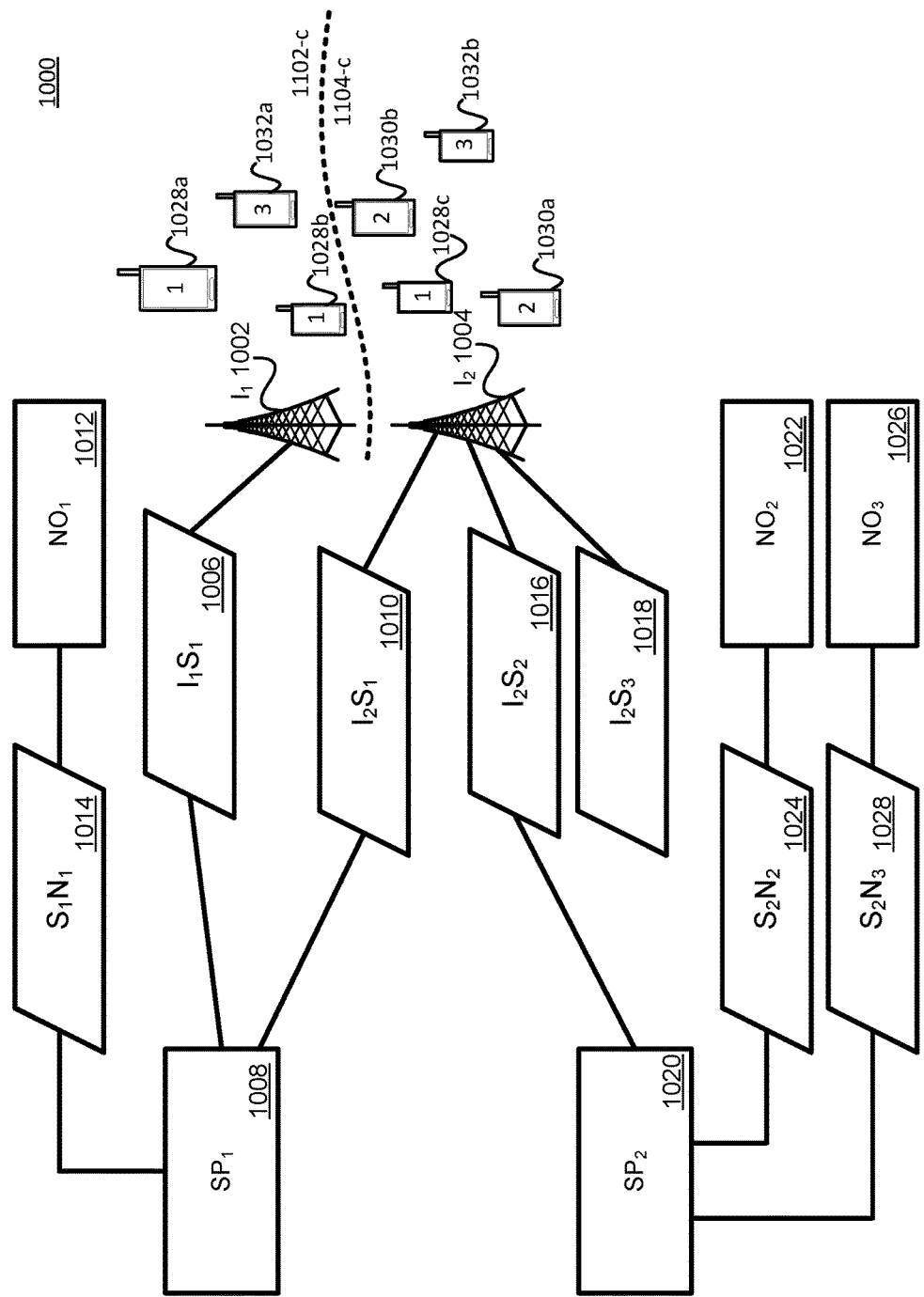
FIG. 10 is a block diagram illustrating a logical network topology according to embodiments of the present invention.

FIG. 10 is a block diagram illustrating a network architecture 1000 according to an embodiment of the present invention. Architecture 1000 includes two different infrastructure providers $I_1$ 1002 having coverage area 1002-c and $I_2$ 1004 having coverage area 1004-c. $I_1$ 1002 provides its resources as a single slice $I_1S_1$ 1006 to $SP_1$ 1008. $SP_1$ 1008 also receives resources from $I_2$ 1004 through slice $I_2S_1$ 1010. $SP_1$ can aggregate the resources it receives in the two slices, and provide the aggregated resources to $NO_1$ 1012 in the form of slice $S_1N_1$ 1014. $I_2$ 1004 also provides slices $I_2S_2$ 1016 to $SP_2$ 1020 and $I_2S_3$ 1018 to an unillustrated SP. $SP_2$ 1020 divides the resources it receives between two NOs. $NO_2$ 1022 receives slice $S_2N_2$, while $NO_3$ 1026 receives slice $S_2N_3$ 1028. $NO_1$ 1012 provides mobile network services to UEs 1028a-c, while $NO_2$ 1022 provides mobile network services to UEs 1030a and 1030b, and $NO_3$ 1026 provides mobile network services to UEs 1032a and 1032b. UEs 1028 1030 and 1032 are spread through the combined coverage areas 1002-c and 1004-c, and not all UEs will be in a service area of the NO that they are subscribed to. It should also be understood that UE 1028b is sufficiently close to the edge of the service area 1004-c that transmissions from $I_2$ 1004 may interfere, and thus UE 1028b would be best serviced by the application of power control in $I_2$ 1004 under the direction Those skilled in the art will appreciate that an InP can provide resources to one or more than one SP. An SP can receive resources from one or more than one InP, and can provide resources to one or more than one NO. The slice $I_1S_1$ 1006 can be a hard slice, as no other slices are being provided. Slices $I_2S_1$ 1010, $I_2S_2$ 1016 and $I_2S_3$ 1018 can be either hard or soft slices. For the purposes of the following discussion, these will be considered to be soft slices. The summation of the resources committed in slices $I_2S_1$ 1010, $I_2S_2$ 1016 and $I_2S_3$ 1018 may exceed the resources available to $I_2$ 1004. Similarly, the resources committed in (soft) slices $S_2N_2$ 1024 and $S_2N_3$ 1028 may exceed the resources of slice $I_2S_2$ on which they are based. This overselling (or oversubscription) of the underlying resources can be accommodated based on the likelihood that not all of the users of a resource will use their full allocation of resources at any given time.

In a soft-sliced environment, conventional mechanisms to provide resource control, such as scheduling and power control, are somewhat ineffective. If $NO_2$ 1022 has an allocation of 150 RBs per 3 TTI window, the number of RBs in any given TTI is indeterminate (even without considering the outage guarantees). In addition to overselling the available resources, it may be advantageous for $SP_2$ 1020 to be able to offer unused RBs to NOs (e.g. if $NO_1$ does not have sufficient data to use its allotment of RBs, the unused (or excess) RBs can be offered to other NOs).

Figure 11:
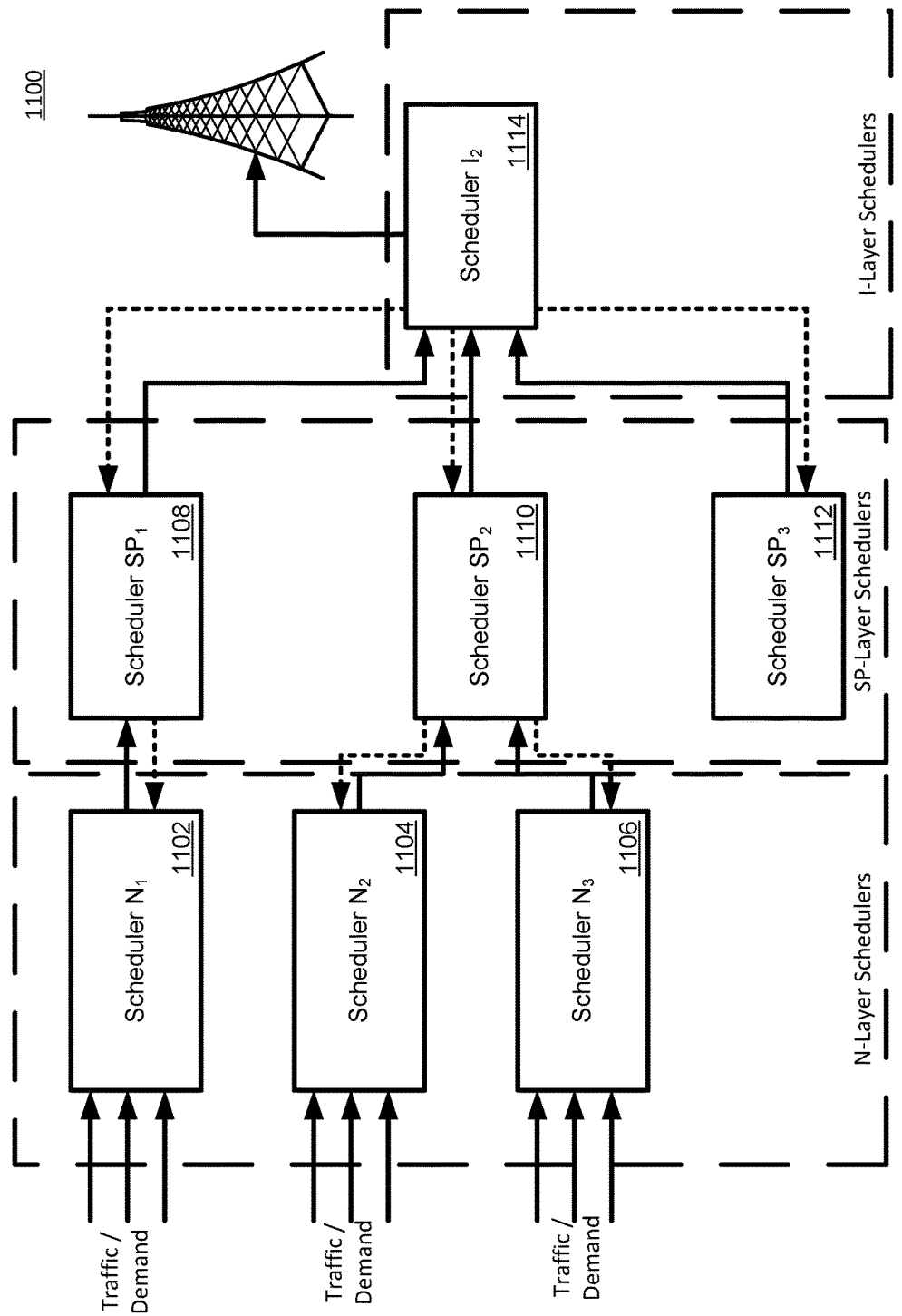
FIG. 11 is a block diagram illustrating the interaction between schedulers in different layers of a sliced network architecture.

To address these issues, a functional architecture 1100 is illustrated in FIG. 11. Because from within its slice, $N_1$ appears to have physical elements including APs, there is a scheduling function Scheduler $N_1$ 1102 within $NO_1$. Those skilled in the art will appreciate that there may be many such functions, and possibly one function for each virtualized representation of an AP within $NO_1$, each virtualized representation of an AP corresponding to a real AP in the PNI. Scheduling functions Scheduler $N_2$ 1003 and Scheduler $N_3$ 1106 are similarly arranged, and collectively Scheduler $N_1$ 1002, Scheduler $N_2$ 1004 and Scheduler $N_3$ 1006 are referred to as N-layer schedulers. Each of the N layer schedulers receives traffic or traffic demand data representative of downlink traffic to be transmitted towards a UE. N-layer schedulers afford the network operator the ability to use its own scheduling algorithms, and to generate a soft schedule. The soft schedule can be based on a number of different factors, including the traffic demand, resource allocations and other such factors as have been discussed with respect to earlier figures. The soft schedule is transmitted to a lower layer scheduler, such as the corresponding SP layer scheduler. $SP_1$ has a scheduler, scheduler $SP_1$, 1108, that receives a soft schedule from scheduler $N_1$ 1102. More interesting for the purposes of this discussion is Scheduler $SP_2$ 1110 which receives soft schedules from Scheduler $N_2$ 1104 and Scheduler $N_3$ 1106. The soft schedules received from N-layer schedulers serve as the traffic/demand input for an SP layer scheduler. Scheduler $SP_3$ 1112 is a scheduler for traffic in slice $I_2S_3$ 1018. The NO(s) from which Scheduler $SP_3$ 1112 receives traffic is not illustrated. SP layer schedulers schedule traffic and generate soft schedules based on the same (or similar) factors to N-layer schedulers. Data received by the SP is transmitted to the I-Layer, schedulers for transmission in accordance with the soft schedule generated by an SP layer scheduler.

Scheduler $I_2$ 1114 is a physical layer scheduler that receives traffic and traffic demands from SP layer schedulers, both as data for transmission and as soft schedules. Scheduler $I_2$ 1114 is associated with at least one AP, and generates a transmission schedule in accordance with the received traffic and other factors including the allocations provided to each slice (which can be associated with the traffic associated with the SP schedulers). The received traffic is provided to an AP associated with Scheduler $I_2$ 1114, in accordance with the generated schedule.

Each of the SP layer schedulers, and the I layer scheduler can use the allocation of resources to the slices that they are receiving traffic from as an input to the generation of a schedule (either soft or transmission).

As indicated, by the presence of the dashed lines, there is an optional interface between the schedulers at each layer, that allows lower layer schedulers to provide scheduling feedback to upper layer schedulers. Thus, the optional interface can allow an I Layer scheduler to provide scheduling feedback to the SP Layer schedulers that it interacts with, and a similar interface allows SP layer schedulers to provide scheduling feedback to N layer schedulers. Feedback from a lower layer scheduler can be used as an input to the scheduling process undertaken by a scheduler.

Those skilled in the art will appreciate that although elements in architecture 1100 are referred to as Schedulers, these elements can also perform Power Control functions along with the generation of a schedule.

Figure 12:
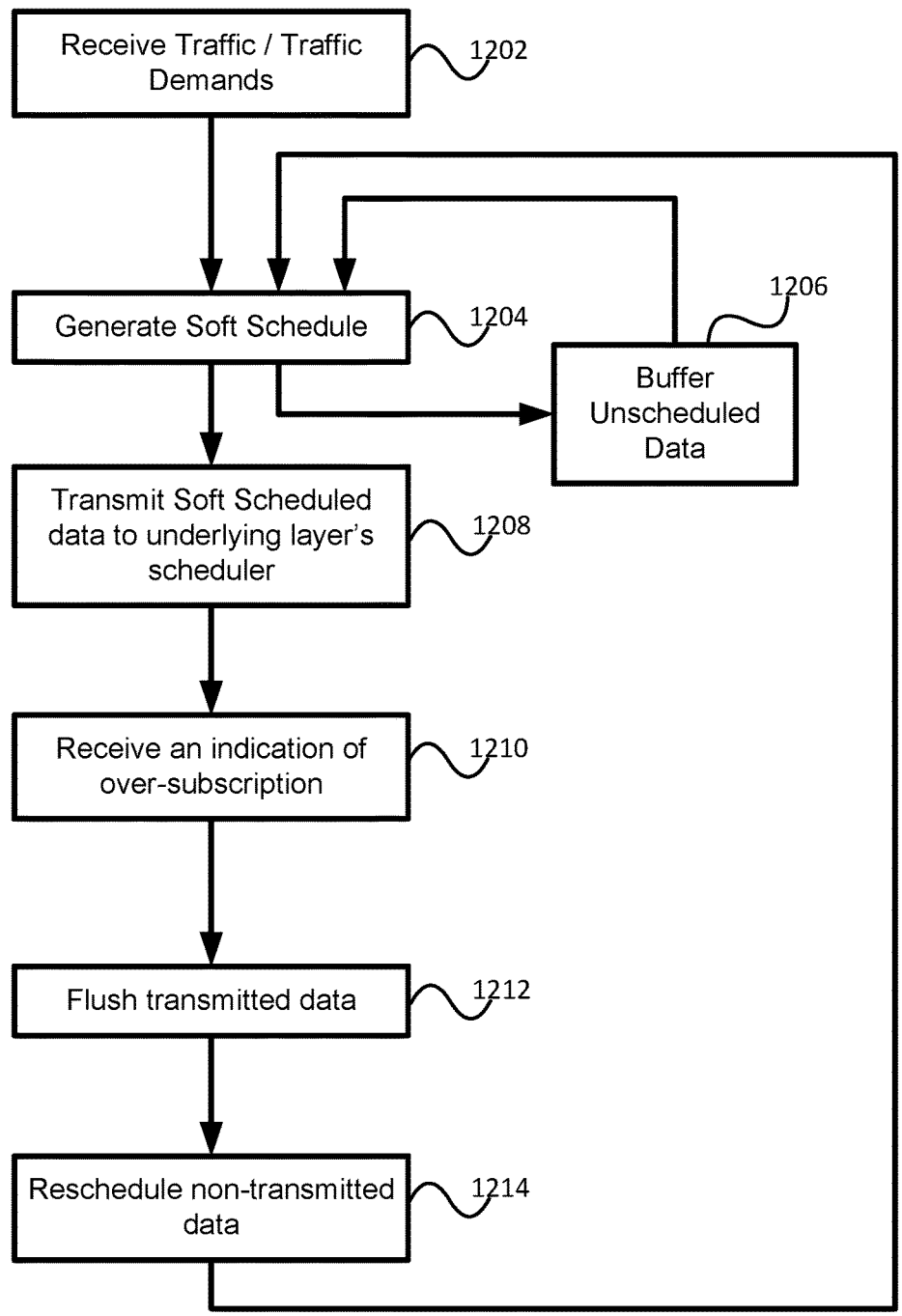
FIG. 12 is a flowchart illustrating a method according to an embodiment of the present invention.
Figure 13A:
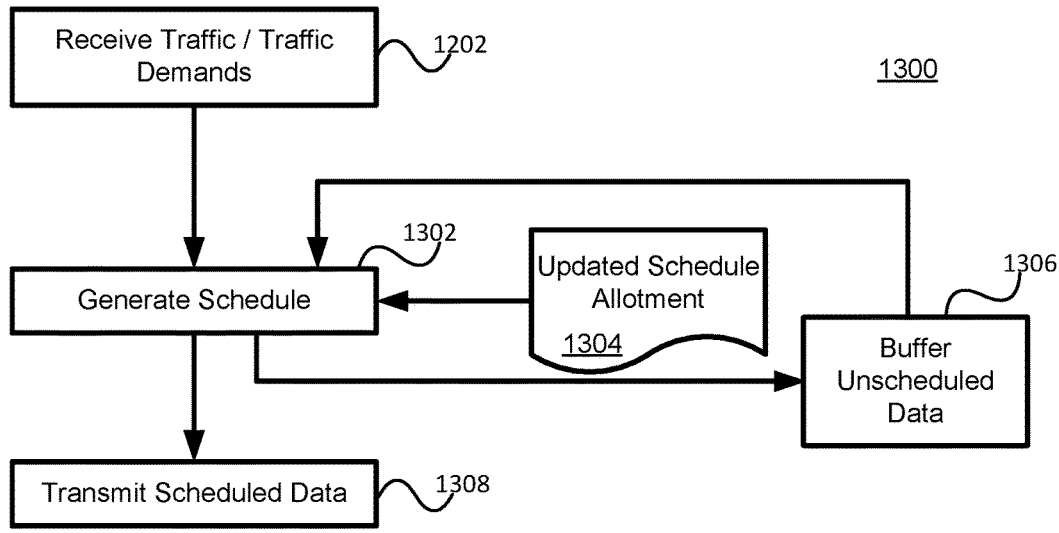
FIGS. 13A and 13B are flow charts illustrating methods carried out by schedulers in an embodiment of the present invention.
Figure 13B:
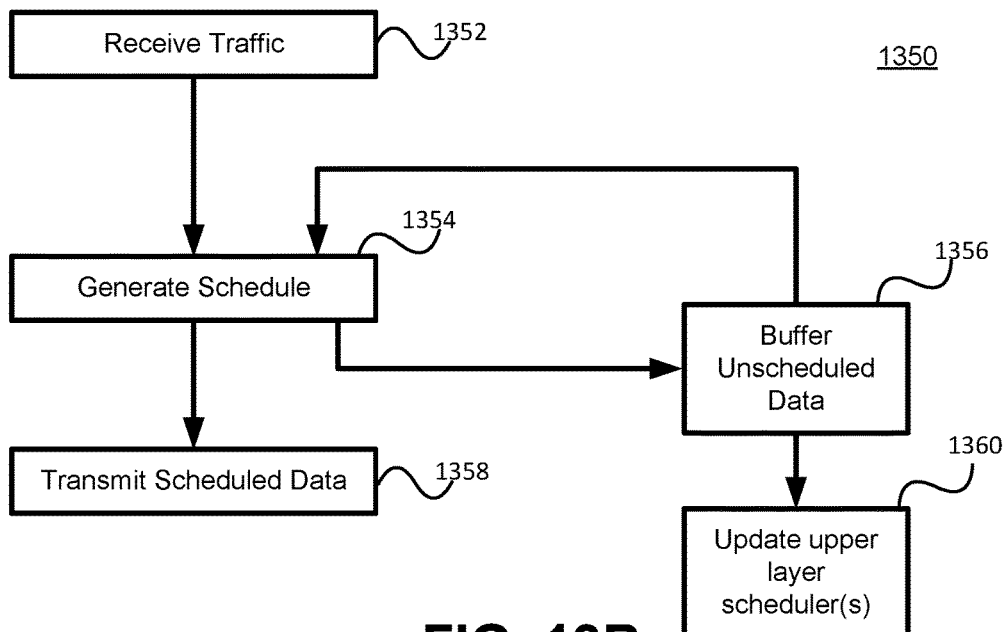
Figure 14:
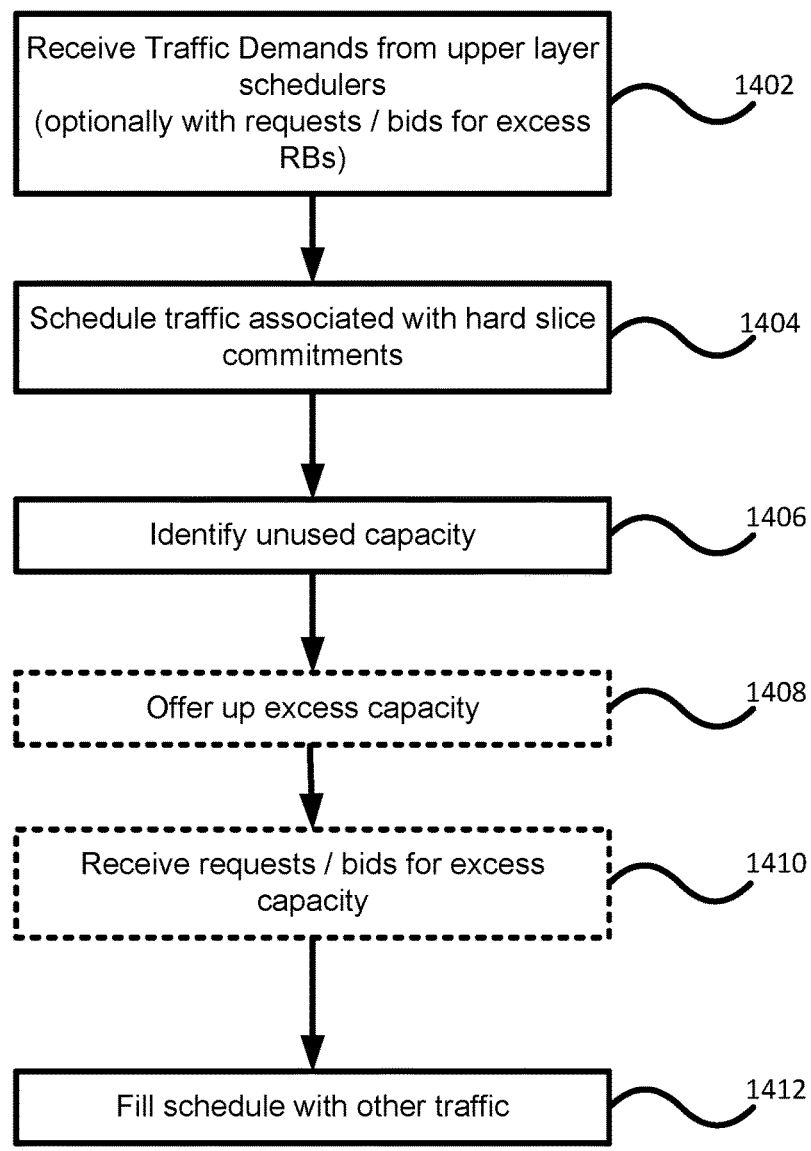
FIG. 14 is a flow chart illustrating an embodiment of the present invention.

A discussion of methods for execution at various scheduling/power control entities in the architectures of FIGS. 10 and 11 will now be presented with respect to FIGS. 12-14.

When embodied within a soft slice, it is not possible for a scheduler to define a transmission schedule as would be done in a conventional 3G/4G network. To accommodate these implementation issues, a flowchart 1200 is presented in FIG. 12 to explain a possible method for scheduling within a slice according to an embodiment of the present invention. Those skilled in the art will appreciate that any soft schedule generated can optionally include power control requests as well.

The physical topology of a wireless network maps logical entities in the network to their physical locations. The location of APs in wireless networks is information that is often provided within a slice of a physical wireless network. Thus, the SP is able to have a vision of a network in which a representation of an Access Point (e.g. a virtualized access point) is provided for each AP associated with resources allocated to the SP. This information can also be provided by the SP to the NO, so that the NO can have the same physical mapping. Scheduling can thus be carried out in the NO for transmission and power control at actual APs. Due to the nature of soft slicing, the NO may not have a clear picture as to the exact allocation of resources, and the NO may also be able to acquire additional resources that were unused by other entities. This variability in the availability of transmission resources is something that is typically not considered or possible in conventional 3G/4G networks. As such, the need for feedback to a scheduler to communicate changing allocations, or to communicate the ability to transmit more data than otherwise expected, would not have been considered in the design of a conventional scheduler that would be found in a 3G/4G network. Due to the variability of the available transmission resources, there must be an accommodation for how data that is sent for transmission is handled when it is not transmitted. The following discussion will provide an explanation of different solutions provided by embodiments of the present invention.

Flowchart 1200 illustrates the process of generating a soft schedule. In 1202, traffic for transmission towards a UE (or information representative of traffic demands) are received. A soft schedule of the received traffic for transmission is generated in step 1204. The generated schedule is referred to as a soft schedule because there is no guarantee that the generated schedule will be respected. This schedule can be generated in accordance with the traffic available for transmission, the allocation of resources to the slice in which the scheduler operates, and other information. If more data is received than can be transmitted, the scheduler can buffer data that was not scheduled in 1206. In the next scheduling iteration, the data that has been buffered can be a part of the data to be transmitted, and may in some embodiments be given priority over newly received traffic. The soft schedule may include a request to transmit more data than is feasible in the allocated resources. There may be an agreed upon charging process as defined in an SLA, or the request to transmit excess data may include an indication of a willingness to pay an indicated amount. The soft schedule, and the soft scheduled data, can be transmitted to a scheduling entity in an underlying network (e.g. a slice closer to the physical network, also referred to as a lower layer) in step 1208. The data provided to the underlying layer for transmission is maintained. In step 1210 the scheduler can receive an indication of oversubscription to the available resources. This can be an indication that the scheduler is not being given the resources that it expects in the given transmission window, or that excess traffic was submitted and cannot be accommodated. It should be understood that the indication received in 1210 may also be an indication that there was no oversubscription as it applies to the data relevant to the scheduler in question. In accordance with the received indication, the data that was transmitted by the underlying layer is flushed by the scheduler in 1212. The non-transmitted data can be rescheduled, either in an explicit step as shown in 1214, or it can be combined with the data buffered in 1206 and newly received data for scheduling in a subsequent transmission window. Those skilled in the art will appreciate that some of the data received for transmission have an associated indication that the data is only relevant for a period of time. If data buffered in 1206, or indicated as not transmitted in 1210, is associated with such an indication, the data may be flushed or rescheduled for transmission depending on whether the data is still relevant.

As will be understood, the method 1200 is relevant to a scheduler that is responsible for storing the received data until confirmation of a lower level transmission has occurred. This process can be carried out by an N-layer scheduler. It can also be carried out by an SP layer scheduler. These two layers could both carry out the method in conjunction with each other. It should be noted that as discussed above, traffic or traffic demands received by an SP layer scheduler are the result of the transmission in step 1208 when the method is executed by an N layer scheduler. As a further optional input into the process of generating a soft schedule, it is possible for the scheduler to receive feedback from a lower layer scheduler. This feedback may include information such as adjustments to the allotment of resources in a subsequent transmission window.

In other embodiments, an upper layer scheduler is not responsible for maintaining the data that has not been transmitted. This allows for a reduction in the amount of feedback that needs to be generated. In such embodiments, a lower layer scheduler can notify an upper layer scheduler of a change in the allocation of resources in a subsequent transmission window to account for data not transmitted. FIG. 13A illustrates the method 1300 carried out at an upper layer scheduler, and FIG. 13B illustrates the method 1350 carried out at a corresponding lower later scheduler. In some embodiments the upper layer scheduler is an N layer scheduler, and the lower layer scheduler is an SP layer scheduler, while in other embodiments the SP layer is the upper layer, and the I layer scheduler is the lower layer scheduler. In step 1202 the upper layer scheduler receives traffic for transmission (or an indication of traffic demand) as discussed above with respect to FIG. 12. In step 1302, a soft schedule is generated in accordance with an indication of an allotment of scheduled resources 1304 that can be received from a lower layer scheduler. Data that is not scheduled, is buffered in 1306, while scheduled data is transmitted to the lower layer in step 1308. In a subsequent transmission window the data buffered in 1306 can be used as an input to the generation of the schedule in 1302.

It will be noted that the upper layer scheduler can consider traffic that has been scheduled and transmitted to the lower layer as having been transmitted. Method 1350 can be carried out at a scheduling function at the lower layer. Traffic from upper layer schedulers is received in 1352. The received traffic is scheduled for transmission in 1354. This step can be performed in accordance with a number of different factors including the resources allocated to each of the slices from which traffic is received, the overall volume of traffic and the resources available for data to be transmitted on. If there is more data received than can be transmitted, the unscheduled data can be buffered in 1356. The scheduled data is transmitted in 1358. If the lower layer is a physical layer (e.g. an I layer scheduler), the transmission of scheduled data in 1358 can include transmitting the data towards the UE through an access point. If the lower layer is not a physical layer (e.g. it is performed by an S layer scheduler), the transmission of the scheduled data 1358 can include the data being provided to a lower layer scheduler much as is done in step 1308. The data buffered in 1356 can be scheduled in a subsequent transmission window, and can also be used to generate an updated allocation for upper layer schedulers in 1360 (corresponding to the updated schedule allotment 1304).

Such a pair of methods allow for a simplified upper layer scheduling process, and allows a lower layer to buffer excess traffic for later transmission. To ensure space in a subsequent schedule, at least one upper layer scheduler can be notified of a change in allocation of scheduled resources.

FIG. 14 is a flowchart illustrating a method 1400 that can be carried out at a lower layer scheduler. This can be carried out at an I layer scheduler, or at a SP layer scheduler. In step 1402, the scheduler receives traffic demands from upper layer schedulers. This may be accompanied by the traffic associated with the demands. If both hard and soft slices are supported, traffic associated with hard slice commitments are scheduled in 1404. If there is unused capacity (which may be unallocated capacity, capacity associated with soft slices, or capacity associated with the hard slices that was unused), it is identified in 1406. In 1412, the unused capacity in the schedule is filled with other traffic. The other traffic may represent traffic received in 1402 that is associated with soft slices. The other traffic may also represent traffic received in 1042 associated with a hard slice that is in excess of the allocation associated with the hard slice. The schedule completed in 1412 can then be used to transit the received data.

In some embodiments, excess data may be received in 1402 and used to fill the unused/excess capacity. The excess data may include requests or bids for excess RBs in the schedule. The determination of how traffic is selected to fill the schedule in 1412 can be made in accordance with these requests.

In some embodiments, the scheduling of data is performed immediately in advance of the transmission window, while in others the scheduling is performed sufficiently in advance to allow the identified unused capacity (also referred to as excess capacity) to be offered to upper layer schedulers in 1408. This can result in the receipt of bids or other requests for the excess capacity as shown in 1410. These bids can be used in the selection of the traffic used to fill the schedule.

Those skilled in the art will appreciate that in FIG. 10, UE 1028b is close to the edge of the service areas of the two infrastructure providers. This UE is associated with $NO_1$ 1012, which is shown as the sole user of the resources in slices $I_1S_1$ 1010 and $I_2S_2$ 1016. Power Control and Resource Allocation, as discussed above, is data that can be used in conjunction with traffic demands to schedule transmissions to UEs. In a single coordinated network, it would be possible to adjust the transmissions from APs in $I_2$ 1004 so that they do not interfere with the transmissions from an AP in $I_1$ 1002 to UE 1028b. As discussed above, it is possible for either $NO_1$ 1012 or $SP_1$ 1008 to determine that power control should be applied based on the geographic distribution of APs, and the location of UE 1028b. This information can be determined by power control functions, which may be integrated with the schedulers discussed in FIGS. 10 and 11. This would result in these schedulers being SPC functions as discussed in FIGS. 5-7. In such embodiments, the power control requests generated by an N Layer Scheduler can be passed to the SP layer scheduler (or from the SP layer scheduler to the I layer scheduler) much as other traffic demands are transmitted. The power control instructions of one layer, can be treated as power control requests at a lower layer, and may be accommodated in the decision of how and when to schedule data.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method, comprising:
    receiving traffic to be scheduled for transmission to a user equipment (UE);
    generating a soft schedule for the transmission of the received traffic in accordance with a resource allocation received from an underlying network and the received traffic, wherein the resource allocation is determined based on resource guarantees, resource usage information and the minimum resources required by a supported network slice over next operational period, the supported network slice comprising a soft slice, the soft slice having flexibility in receipt of the resource allocation; and
    transmitting the soft schedule to a scheduler in the underlying network, for transmission to the UE, wherein transmitting the soft schedule to the scheduler in the underlying network includes transmitting the traffic identified in the soft schedule to an entity in the underlying network.

2. The method of claim 1 further including buffering a portion of the received traffic in accordance with an indication that the portion cannot be scheduled for transmission in a current transmission window.

3. The method of claim 1 wherein the soft schedule is generated in accordance with traffic demands associated with a buffered portion of traffic received in a previous transmission window.

4. The method of claim 1 further including transmitting an indication of an updated resource allocation to a scheduler in a supported network slice in accordance with the buffered traffic.

5. The method of claim 1 wherein the resource allocation is associated with a network slice.

6. The method of claim 1 further including storing traffic associated with the soft schedule.

7. The method of claim 6 further including receiving an indication of oversubscription from the scheduler in the underlying network.

8. The method of claim 7 further including flushing a portion of the stored traffic associated with the soft schedule in accordance with the received indication of oversubscription.

9. The method of claim 7 wherein the soft schedule is generated in accordance with the received indication of oversubscription.

10. The method of claim 1 wherein the soft schedule is generated in accordance with an updated resource allocation received from a resource allocator in the underlying network.

11. A scheduler comprising:
a processor; and
machine readable memory storing machine executable instructions which when executed by the processor configures the scheduler to:
receive traffic to be scheduled for transmission to a user equipment (UE);
generate a soft schedule for the transmission of the received traffic in accordance with a resource allocation received from an underlying network and the received traffic, wherein the resource allocation is determined based on resource guarantees, resource usage information and the minimum resources required by a supported network slice over next operational period, the supported network slice comprising a soft slice, the soft slice having flexibility in receipt of the resource allocation; and
transmit the soft schedule to a scheduler in the underlying network, for transmission to the UE, wherein the machine executable instructions configures the scheduler to transmit the soft schedule to the scheduler in the underlying network includes instructions for transmitting the traffic identified in the soft schedule to an entity in the underlying network.

12. The scheduler of claim 11 wherein the machine executable instructions configures the scheduler to buffer a portion of the received traffic in accordance with an indication that the portion cannot be scheduled for transmission in a current transmission window.

13. The scheduler of claim 12 wherein the machine executable instructions configures the scheduler to transmit an indication of an updated resource allocation to a scheduler in a supported network slice in accordance with the buffered traffic.

14. The scheduler of claim 11 wherein the machine executable instructions configures the scheduler to store traffic associated with the soft schedule.

15. The scheduler of claim 14 wherein the machine executable instructions configures the scheduler to receive an indication of oversubscription from the scheduler in the underlying network.

16. The scheduler of claim 15 wherein the machine executable instructions configures the scheduler to flush a portion of the stored traffic associated with the soft schedule in accordance with the received indication of oversubscription.

17. The scheduler of claim 11 wherein the machine executable instructions causes the scheduler to update the soft schedule in accordance with an updated resource allocation received from a resource allocator in the underlying network.

18. The method of claim 7 wherein the indication of oversubscription is from one of:
an indication that the scheduler does not have the resources in a given transmission window; and
that excess traffic was submitted and cannot be accommodated.

19. The scheduler of claim 15 wherein the indication of oversubscription is from one of:
an indication that the scheduler does not have the resources in a given transmission window; and
that excess traffic was submitted and cannot be accommodated.

20. The method of claim 1 wherein generating a soft schedule for the transmission of the received traffic is in further accordance with feedback received from the underlying network.

21. The method of claim 20 wherein the feedback includes:
adjustments to the allotment of resources in a subsequent transmission window; and
an indication of an ability to transmit more traffic than otherwise expected.

22. The scheduler of claim 11 wherein the machine readable memory storing machine executable instructions which when executed by the processor configures the scheduler to generate the soft schedule for the transmission of the received traffic in further accordance with received feedback including:
adjustments to the allotment of resources in a subsequent transmission window; and
an indication of an ability to transmit more data than otherwise expected.

23. The method of claim 1 wherein the resource allocation includes resource allocation in a given time window.

24. The scheduler of claim 11 wherein the resource allocation includes resource allocation in a given time window.

25. The method of claim 1 wherein the resource allocation received from an underlying network is received from a resource allocator of the underlying network which provides resource allocation to multiple slices.

26. The method of claim 1 wherein the supported network slice operates as a soft slice.

27. A system comprising:
a first scheduler and a second scheduler,
wherein the first scheduler is configured to:
receive traffic to be scheduled for transmission to a user equipment (UE);
generate a soft schedule for the transmission of the received traffic in accordance with a resource allocation received from the underlying network and the received traffic, wherein the resource allocation is determined based on resource guarantees, resource usage information and the minimum resources required by a supported network slice over next operational period, the supported network slice comprising a soft slice, the soft slice having flexibility in receipt of the resource allocation; and transmit the soft schedule to the second scheduler; and the second scheduler is configured to transmit the traffic to the UE according to the soft schedule received from the first schedule, and the second scheduler is in an underlying network.

28. The method of claim 1 further including performing power control functions.

29. The scheduler of claim 11 wherein the machine executable instructions configures the scheduler to perform power control functions.

30. The system of claim 27, wherein one or more of the first scheduler and the second scheduler are configured to perform power control functions.

* * * * *